United States Patent
Gandel et al.

(10) Patent No.: US 7,892,371 B2
(45) Date of Patent: Feb. 22, 2011

(54) FOLDABLE TRANSACTION CARDS AND METHODS OF MAKING THE SAME

(75) Inventors: Priscilla Gandel, Long Branch, NJ (US); Ellen Lasch, New York, NY (US); Lisa Ann Morrill Webb, East Sussex (GB)

(73) Assignee: American Express Travel Related Services Company, Inc., New York, NY (US)

( * ) Notice: Subject to any disclaimer, the term of this patent is extended or adjusted under 35 U.S.C. 154(b) by 211 days.

(21) Appl. No.: 12/102,811

(22) Filed: Apr. 14, 2008

(65) Prior Publication Data

US 2009/0014110 A1 Jan. 15, 2009

Related U.S. Application Data

(60) Division of application No. 11/604,502, filed on Nov. 27, 2006, now Pat. No. 7,540,426, which is a continuation-in-part of application No. 10/733,619, filed on Dec. 10, 2003, now Pat. No. 7,147,151, which is a continuation-in-part of application No. 10/436,394, filed on May 12, 2003, now Pat. No. 7,213,764.

(60) Provisional application No. 60/442,991, filed on Jan. 28, 2003, provisional application No. 60/424,592, filed on Nov. 7, 2002.

(51) Int. Cl.
*B32B 37/02* (2006.01)
(52) U.S. Cl. .................. 156/60; 156/250; 156/252; 156/253; 156/268; 156/182; 902/25
(58) Field of Classification Search .............. 156/349, 156/538
See application file for complete search history.

(56) References Cited

U.S. PATENT DOCUMENTS

| | | | |
|---|---|---|---|
| 2,767,756 | A | 10/1956 | Niles |
| 3,369,585 | A | 2/1968 | Martinsen |
| 3,446,260 | A | 5/1969 | Osher |
| 3,647,165 | A | 3/1972 | Whitla |
| 3,648,832 | A | 3/1972 | Kirshenbaum et al. |
| 3,703,760 | A | 11/1972 | Pommer |

(Continued)

FOREIGN PATENT DOCUMENTS

CA 2300241 9/2000

(Continued)

OTHER PUBLICATIONS

W. Rankl "Handbuch der Chipkarten" Handbuch Der Chipkarten Aufbau-Funktionsweise—Einsatz Von Smart Cards Muenchen: Carl Hanser Vertag Germany 1999 pp. 44-55 XP002204908.

(Continued)

*Primary Examiner*—Khanh Nguyen
*Assistant Examiner*—Margaret Squalls
(74) *Attorney, Agent, or Firm*—Snell & Wilmer L.L.P.

(57) ABSTRACT

Transaction cards are provided wherein the foldable transaction cards have internal hinge material disposed within the foldable transaction card and fold lines for folding the transaction cards. In addition, foldable transaction card systems are provided, whereby transaction cards, having the internal hinge material, are provided within housings, cases or carriers. Moreover, methods of making foldable transaction cards are provided.

16 Claims, 24 Drawing Sheets

U.S. PATENT DOCUMENTS

| | | | |
|---|---|---|---|
| 3,777,795 A | 12/1973 | Graetz |
| 3,929,177 A | 12/1975 | Reis |
| 3,940,016 A | 2/1976 | Krakauer |
| 3,946,781 A | 3/1976 | Reis |
| 3,994,328 A | 11/1976 | Reis |
| 4,048,737 A | 9/1977 | McDermott |
| 4,056,139 A | 11/1977 | Murt |
| 4,105,057 A | 8/1978 | Baumann et al. |
| 4,222,516 A | 9/1980 | Badet et al. |
| 4,277,863 A | 7/1981 | Faneuf |
| 4,318,554 A | 3/1982 | Anderson et al. |
| 4,342,350 A | 8/1982 | Resnick |
| 4,356,646 A | 11/1982 | Johnson, Jr. |
| D270,303 S | 8/1983 | Zautner |
| 4,562,342 A | 12/1985 | Solo |
| 4,581,523 A | 4/1986 | Okuno |
| 4,614,144 A | 9/1986 | Sagara et al. |
| 4,643,452 A | 2/1987 | Chang |
| 4,697,363 A | 10/1987 | Gamm |
| 4,717,908 A | 1/1988 | Phillips et al. |
| 4,721,948 A | 1/1988 | Lin |
| 4,744,497 A | 5/1988 | O'Neal |
| 4,768,811 A | 9/1988 | Oshikoshi et al. |
| 4,792,843 A | 12/1988 | Haghiri-Tehrani et al. |
| 4,801,790 A | 1/1989 | Solo |
| 4,849,617 A | 7/1989 | Ueda |
| 4,851,610 A | 7/1989 | LeBlanc et al. |
| 4,884,507 A | 12/1989 | Levy |
| 4,897,533 A | 1/1990 | Lyszczarz |
| 4,897,947 A | 2/1990 | Kass-Pious |
| 4,907,634 A | 3/1990 | Yoo |
| 4,917,292 A | 4/1990 | Drexler |
| D307,979 S | 5/1990 | Purvis |
| 4,930,234 A | 6/1990 | Schmidt |
| 4,937,963 A | 7/1990 | Barnes |
| 4,957,311 A | 9/1990 | Geisenheimer |
| 5,004,899 A | 4/1991 | Ueda |
| 5,007,899 A | 4/1991 | Larsson |
| 5,015,830 A | 5/1991 | Masuzawa et al. |
| 5,052,328 A | 10/1991 | Eppenbach |
| 5,053,749 A | 10/1991 | Weiss |
| 5,059,052 A | 10/1991 | Casper |
| 5,065,004 A | 11/1991 | Mizuno et al. |
| 5,096,228 A | 3/1992 | Rinderknecht |
| 5,125,356 A | 6/1992 | Galante |
| 5,171,039 A | 12/1992 | Dusek |
| 5,189,894 A | 3/1993 | Buck |
| 5,192,947 A | 3/1993 | Neustein |
| 5,215,334 A | 6/1993 | Presson et al. |
| 5,257,656 A | 11/1993 | McLeroy |
| 5,279,019 A | 1/1994 | Knickle |
| 5,308,121 A | 5/1994 | Gunn |
| 5,311,679 A | 5/1994 | Birch |
| 5,358,019 A | 10/1994 | Sumner, III |
| 5,461,219 A | 10/1995 | Cronvall et al. |
| 5,478,629 A | 12/1995 | Norman |
| 5,503,434 A | 4/1996 | Gunn et al. |
| 5,506,395 A | 4/1996 | Eppley |
| 5,520,230 A | 5/1996 | Sumner, III |
| 5,541,985 A | 7/1996 | Ishii et al. |
| 5,552,002 A * | 9/1996 | Farrell et al. ................ 156/82 |
| 5,572,815 A | 11/1996 | Kovner |
| 5,575,094 A | 11/1996 | Leake et al. |
| 5,577,609 A | 11/1996 | Hexter |
| 5,653,336 A | 8/1997 | Kuonaiuto et al. |
| 5,658,157 A | 8/1997 | Koiwa et al. |
| 5,665,439 A | 9/1997 | Andersen et al. |
| 5,700,037 A | 12/1997 | Keller et al. |
| 5,710,421 A | 1/1998 | Kokubu |
| 5,713,406 A | 2/1998 | Drury |
| 5,725,098 A | 3/1998 | Seifert et al. |
| 5,727,696 A | 3/1998 | Valiulis |
| 5,775,398 A | 7/1998 | Siegel |
| 5,791,474 A | 8/1998 | Hansen |
| 5,823,359 A | 10/1998 | Harris et al. |
| 5,837,380 A | 11/1998 | Choi et al. |
| 5,840,143 A | 11/1998 | Swanson |
| 5,844,230 A | 12/1998 | Lalonde |
| 5,865,470 A | 2/1999 | Thompson |
| 5,870,459 A | 2/1999 | Phillips et al. |
| 5,886,333 A | 3/1999 | Miyake |
| 5,888,624 A | 3/1999 | Haghiri et al. |
| 5,894,597 A | 4/1999 | Schwartz et al. |
| 5,912,446 A | 6/1999 | Wong et al. |
| 5,915,016 A | 6/1999 | Savalle et al. |
| 5,924,624 A | 7/1999 | Martin |
| 5,928,809 A | 7/1999 | Ju |
| 5,933,328 A | 8/1999 | Wallace et al. |
| 5,936,227 A | 8/1999 | Truggelmann et al. |
| 5,938,010 A | 8/1999 | Osterbye |
| 5,968,570 A | 10/1999 | Paulucci |
| 5,973,475 A | 10/1999 | Combaluzier |
| 5,979,942 A | 11/1999 | Ivicic |
| 6,006,988 A | 12/1999 | Behrmann et al. |
| 6,024,385 A | 2/2000 | Goda |
| 6,025,283 A | 2/2000 | Roberts |
| 6,027,028 A | 2/2000 | Pieterse et al. |
| 6,032,866 A | 3/2000 | Knighton et al. |
| 6,050,605 A | 4/2000 | Mikelionis et al. |
| 6,082,422 A | 7/2000 | Kaminski |
| 6,086,971 A | 7/2000 | Haas et al. |
| 6,099,043 A | 8/2000 | Story |
| 6,116,655 A | 9/2000 | Thouin et al. |
| 6,118,986 A | 9/2000 | Harris et al. |
| D432,939 S | 10/2000 | Hooglander |
| 6,128,604 A | 10/2000 | Sakamaki et al. |
| 6,148,484 A | 11/2000 | Andreae, Jr. |
| 6,171,138 B1 | 1/2001 | Lefebvre et al. |
| 6,184,788 B1 | 2/2001 | Middlemiss et al. |
| 6,189,779 B1 | 2/2001 | Verdicchio et al. |
| 6,190,747 B1 | 2/2001 | Fischer |
| 6,197,396 B1 | 3/2001 | Haas et al. |
| 6,200,272 B1 | 3/2001 | Linden |
| 6,223,977 B1 | 5/2001 | Hill |
| 6,227,424 B1 | 5/2001 | Roegner |
| 6,292,561 B1 | 9/2001 | Benson |
| 6,315,206 B1 | 11/2001 | Hansen et al. |
| 6,330,961 B1 | 12/2001 | Borja |
| D453,160 S | 1/2002 | Pentz et al. |
| D453,161 S | 1/2002 | Pentz |
| D453,337 S | 2/2002 | Pentz et al. |
| D453,338 S | 2/2002 | Pentz et al. |
| D453,339 S | 2/2002 | Pentz et al. |
| D453,516 S | 2/2002 | Pentz |
| D454,910 S | 3/2002 | Smith et al. |
| D454,920 S | 3/2002 | Smith et al. |
| 6,367,122 B1 | 4/2002 | Tagawa |
| 6,375,081 B1 | 4/2002 | Hileman et al. |
| D457,556 S | 5/2002 | Hochschild |
| D460,455 S | 7/2002 | Pentz |
| 6,415,138 B2 | 7/2002 | Sirola et al. |
| 6,419,158 B2 | 7/2002 | Hooglander |
| 6,421,245 B1 | 7/2002 | Kashima |
| D461,477 S | 8/2002 | Pentz |
| 6,435,236 B2 | 8/2002 | Gribovsky |
| D462,965 S | 9/2002 | Pentz |
| D462,966 S | 9/2002 | Pentz |
| 6,457,649 B1 | 10/2002 | Hileman |
| 6,460,696 B1 | 10/2002 | Meyer |
| 6,471,127 B2 | 10/2002 | Pentz et al. |
| 6,497,368 B1 | 12/2002 | Friend et al. |
| D470,627 S | 2/2003 | Kuo |
| 6,523,292 B2 | 2/2003 | Slavik |
| D474,234 S | 5/2003 | Nelms et al. |

| | | | |
|---|---|---|---|
| 6,590,303 B1 | 7/2003 | Austin et al. | |
| 6,601,622 B1 | 8/2003 | Young | |
| 6,644,551 B2 | 11/2003 | Clayman et al. | |
| 6,644,552 B1 | 11/2003 | Herslow | |
| 6,651,813 B2 | 11/2003 | Vallans et al. | |
| 6,651,892 B2 | 11/2003 | Hooglander | |
| 6,681,926 B2 | 1/2004 | DeVolpi | |
| 6,705,529 B1 | 3/2004 | Kettunen et al. | |
| 6,735,081 B1 | 5/2004 | Bishop et al. | |
| 6,751,805 B1 | 6/2004 | Austion | |
| 6,752,272 B2 | 6/2004 | Jones et al. | |
| 6,764,014 B2 | 7/2004 | Lasch et al. | |
| 6,766,952 B2 | 7/2004 | Luu | |
| 6,788,919 B2 | 9/2004 | Watanabe | |
| 6,802,348 B2 | 10/2004 | Vernon et al. | |
| 6,823,910 B1 | 11/2004 | Elnekaveh | |
| 6,824,066 B2 | 11/2004 | Weyant | |
| 6,839,432 B1 | 1/2005 | Martin | |
| 6,842,336 B2 | 1/2005 | Schremmer et al. | |
| 6,843,422 B2 | 1/2005 | Jones et al. | |
| 6,845,583 B2 | 1/2005 | Lee | |
| 6,845,863 B1 | 1/2005 | Riley | |
| 6,866,439 B2 | 3/2005 | Steinschaden | |
| 6,871,682 B2 | 3/2005 | Hogganvik | |
| 6,876,848 B2 | 4/2005 | Spitaletta et al. | |
| 6,892,875 B2 | 5/2005 | DeVolpi | |
| 6,910,624 B1 | 6/2005 | Natsuno | |
| 6,910,718 B2 | 6/2005 | Chareas et al. | |
| 6,923,229 B2 | 8/2005 | Beckley | |
| 6,974,076 B1 | 12/2005 | Siegel | |
| 6,978,940 B2 | 12/2005 | Luu | |
| 6,987,970 B2 | 1/2006 | Okazaki et al. | |
| 6,991,172 B2 | 1/2006 | Luu | |
| 7,023,692 B2 | 4/2006 | Mansutti et al. | |
| 7,048,216 B2 | 5/2006 | Hodson et al. | |
| 7,055,740 B1 | 6/2006 | Schultz et al. | |
| 7,059,520 B1 | 6/2006 | Shtesl | |
| 7,070,095 B1 | 7/2006 | Gandel et al. | |
| 7,079,875 B2 | 7/2006 | Robertson, Jr. | |
| D526,779 S | 8/2006 | Gandel et al. | |
| 7,100,829 B2 | 9/2006 | Okada | |
| 7,124,955 B2 | 10/2006 | Lasch et al. | |
| 7,130,648 B1 | 10/2006 | Fournier et al. | |
| 7,137,552 B1 | 11/2006 | Lasch et al. | |
| 7,147,151 B2 | 12/2006 | Lasch et al. | |
| 7,156,301 B1 | 1/2007 | Bonalle et al. | |
| 7,161,747 B2 | 1/2007 | Yang, Jr. | |
| 7,198,199 B2 | 4/2007 | Ho | |
| 7,213,764 B2 | 5/2007 | Lasch et al. | |
| 7,249,715 B1 | 7/2007 | Lambright | |
| 7,261,133 B1 | 8/2007 | Copeland | |
| 7,270,255 B2 | 9/2007 | Badillo et al. | |
| 7,278,584 B1 | 10/2007 | Gandel et al. | |
| 7,290,364 B2 | 11/2007 | Nelms et al. | |
| 7,310,692 B2 | 12/2007 | Miller et al. | |
| 7,336,973 B2 | 2/2008 | Goldthwaite et al. | |
| 7,340,540 B2 | 3/2008 | Miller et al. | |
| 7,344,072 B2 | 3/2008 | Gonzalez et al. | |
| 7,347,360 B2 | 3/2008 | Lasch et al. | |
| 7,364,090 B2 | 4/2008 | Cuellar et al. | |
| 7,383,989 B2 | 6/2008 | Lasch et al. | |
| 7,385,508 B1 | 6/2008 | Ray et al. | |
| 7,398,931 B2 | 7/2008 | Lasch et al. | |
| 7,434,739 B2 | 10/2008 | Matsuura et al. | |
| 7,491,723 B2 | 2/2009 | Grant et al. | |
| 7,520,439 B1 | 4/2009 | Gandel et al. | |
| 2001/0003071 A1 | 6/2001 | Mansutti et al. | |
| 2001/0003498 A1 | 6/2001 | Uwabo et al. | |
| 2001/0012637 A1 | 8/2001 | Casterlin et al. | |
| 2001/0021657 A1 | 9/2001 | Morita | |
| 2001/0022446 A1 | 9/2001 | Klure | |
| 2001/0032690 A1 | 10/2001 | Gribovsky | |
| 2001/0033078 A1 | 10/2001 | Robertson et al. | |
| 2001/0045469 A1 | 11/2001 | Hooglander | |
| 2002/0016687 A1 | 2/2002 | Felsenstein et al. | |
| 2002/0037714 A1 | 3/2002 | Takae et al. | |
| 2002/0040935 A1 | 4/2002 | Weyant | |
| 2002/0041093 A1 | 4/2002 | Cox et al. | |
| 2002/0046962 A1 | 4/2002 | Vallans et al. | |
| 2002/0065106 A1 | 5/2002 | Bishop et al. | |
| 2002/0074246 A1 | 6/2002 | Tiscione et al. | |
| 2002/0083239 A1 | 6/2002 | Iida et al. | |
| 2002/0086704 A1 | 7/2002 | Meindl et al. | |
| 2002/0092914 A1 | 7/2002 | Pentz et al. | |
| 2002/0100475 A1 | 8/2002 | McKinney et al. | |
| 2002/0104811 A1 | 8/2002 | Young et al. | |
| 2002/0114130 A1 | 8/2002 | Schremmer et al. | |
| 2002/0125164 A1 | 9/2002 | Bassinson | |
| 2002/0130186 A1 | 9/2002 | Lasch et al. | |
| 2002/0137537 A1 | 9/2002 | Watanabe | |
| 2002/0153410 A1 | 10/2002 | Santini | |
| 2002/0166897 A1 | 11/2002 | Hooglander | |
| 2002/0177407 A1 | 11/2002 | Mitsumoto | |
| 2003/0014891 A1 | 1/2003 | Nelms et al. | |
| 2003/0015269 A1 | 1/2003 | Vetter | |
| 2003/0037851 A1 | 2/2003 | Hogganvik | |
| 2003/0047482 A1 | 3/2003 | Jones et al. | |
| 2003/0064353 A1 | 4/2003 | Clapper | |
| 2003/0085285 A1 | 5/2003 | Luu | |
| 2003/0085288 A1 | 5/2003 | Luu | |
| 2003/0098257 A1 | 5/2003 | Robertson | |
| 2003/0106941 A1 | 6/2003 | Lisimaque et al. | |
| 2003/0124294 A1 | 7/2003 | Hodson et al. | |
| 2003/0132132 A1 | 7/2003 | Small | |
| 2003/0143014 A1 | 7/2003 | Steinschaden | |
| 2003/0148056 A1 | 8/2003 | Utz et al. | |
| 2003/0150756 A1 | 8/2003 | Kajiya | |
| 2003/0153356 A1 | 8/2003 | Liu | |
| 2003/0173242 A1 | 9/2003 | Fisher et al. | |
| 2003/0178495 A1 | 9/2003 | Jones et al. | |
| 2003/0181074 A1 | 9/2003 | Liu | |
| 2003/0195020 A1 | 10/2003 | Kubo | |
| 2003/0213849 A1 | 11/2003 | Luu | |
| 2003/0222153 A1 | 12/2003 | Pentz et al. | |
| 2004/0010953 A1 | 1/2004 | Chimenti et al. | |
| 2004/0087339 A1 | 5/2004 | Goldthwaite et al. | |
| 2004/0089724 A1 | 5/2004 | Lasch et al. | |
| 2004/0093689 A1 | 5/2004 | Sosa et al. | |
| 2004/0104268 A1 | 6/2004 | Bailey | |
| 2004/0108032 A1 | 6/2004 | Lyons | |
| 2004/0112968 A1 | 6/2004 | Webb et al. | |
| 2004/0124104 A1 | 7/2004 | DeVolpi | |
| 2004/0126284 A1 | 7/2004 | Lilly et al. | |
| 2004/0127256 A1 | 7/2004 | Goldthwaite et al. | |
| 2004/0129785 A1 | 7/2004 | Luu | |
| 2004/0144846 A1 | 7/2004 | Lasch et al. | |
| 2004/0148837 A1 | 8/2004 | Lewis | |
| 2004/0169087 A1 | 9/2004 | Lasch et al. | |
| 2004/0169088 A1 | 9/2004 | Nelms et al. | |
| 2004/0172736 A1 | 9/2004 | Reid | |
| 2004/0204090 A1 | 10/2004 | West et al. | |
| 2004/0225796 A1 | 11/2004 | Hanson et al. | |
| 2004/0256455 A1 | 12/2004 | Fukushima et al. | |
| 2005/0001041 A1 | 1/2005 | McCarthy et al. | |
| 2005/0011776 A1 | 1/2005 | Nagel | |
| 2005/0017502 A1 | 1/2005 | Chariker | |
| 2005/0025117 A1 | 2/2005 | Inagaki et al. | |
| 2005/0033994 A1 | 2/2005 | Suzuki | |
| 2005/0136996 A1 | 6/2005 | Robertson, Jr. | |
| 2005/0150961 A1 | 7/2005 | Porter | |
| 2005/0174656 A1 | 8/2005 | Yang, Jr. | |
| 2005/0184166 A1 | 8/2005 | Pentz et al. | |
| 2005/0197169 A1 | 9/2005 | Son | |
| 2005/0205665 A1 | 9/2005 | Lasch et al. | |
| 2005/0230483 A1 | 10/2005 | Miller et al. | |
| 2005/0241972 A1 | 11/2005 | Hassett | |

| | | |
|---|---|---|
| 2005/0247798 A1 | 11/2005 | Graves et al. |
| 2005/0272483 A1 | 12/2005 | Ko et al. |
| 2005/0282583 A1 | 12/2005 | Kawai et al. |
| 2006/0016810 A1 | 1/2006 | Liporice et al. |
| 2006/0038396 A1 | 2/2006 | Thompson et al. |
| 2006/0049922 A1 | 3/2006 | Kolpasky et al. |
| 2006/0094479 A1 | 5/2006 | Napier-Clark |
| 2006/0105821 A1 | 5/2006 | Goradesky et al. |
| 2006/0113345 A1 | 6/2006 | Zoullas et al. |
| 2006/0118616 A1 | 6/2006 | Schultz et al. |
| 2006/0151077 A1 | 7/2006 | Milford |
| 2006/0162209 A1 | 7/2006 | Philpot |
| 2006/0175416 A1 | 8/2006 | Ho |
| 2006/0186196 A1 | 8/2006 | Schultz et al. |
| 2006/0192723 A1 | 8/2006 | Harada et al. |
| 2006/0201594 A1 | 9/2006 | Carmichael |
| 2006/0206582 A1 | 9/2006 | Finn |
| 2006/0208066 A1 | 9/2006 | Finn et al. |
| 2006/0226217 A1 | 10/2006 | Narendra et al. |
| 2006/0231609 A1 | 10/2006 | Lazarowicz et al. |
| 2006/0234778 A1 | 10/2006 | Matsushita et al. |
| 2006/0236326 A1 | 10/2006 | Aguirre |
| 2006/0237544 A1 | 10/2006 | Matsuura et al. |
| 2006/0278723 A1 | 12/2006 | Dan et al. |
| 2006/0282553 A1 | 12/2006 | Miller et al. |
| 2006/0287004 A1 | 12/2006 | Fuqua |
| 2006/0293085 A1 | 12/2006 | Lauper |
| 2007/0057004 A1 | 3/2007 | Butler et al. |
| 2007/0068978 A1 | 3/2007 | Jackson et al. |
| 2007/0069034 A1 | 3/2007 | Lasch et al. |
| 2007/0080935 A1 | 4/2007 | Hanson et al. |
| 2007/0096924 A1 | 5/2007 | Home |
| 2007/0099511 A1 | 5/2007 | Miller et al. |
| 2007/0108279 A1 | 5/2007 | Wang |
| 2007/0123190 A1 | 5/2007 | Enmei |
| 2007/0152066 A1 | 7/2007 | Colby et al. |
| 2007/0158435 A1 | 7/2007 | Lasch et al. |
| 2007/0232371 A1 | 10/2007 | Soekawa et al. |
| 2007/0251995 A1 | 11/2007 | Kingsborough et al. |
| 2007/0252010 A1 | 11/2007 | Gonzalez et al. |
| 2007/0275759 A1 | 11/2007 | Kemppinen |
| 2008/0093467 A1 | 4/2008 | Narendra et al. |
| 2008/0135144 A1 | 6/2008 | Brody |
| 2008/0265021 A1 | 10/2008 | Williams et al. |
| 2008/0283614 A1 | 11/2008 | Emery |
| 2009/0039154 A1 | 2/2009 | Williams et al. |

FOREIGN PATENT DOCUMENTS

| | | |
|---|---|---|
| DE | 19741726 | 9/1997 |
| EP | 0735505 | 10/1996 |
| GB | 2281714 | 3/1995 |
| JP | 361100436 | 5/1986 |
| WO | WO0073989 | 12/2000 |
| WO | WO0113320 | 2/2001 |
| WO | WO02067190 | 8/2002 |
| WO | WO2004052657 | 6/2004 |

OTHER PUBLICATIONS

Notice of Allowance issued Feb. 9, 2007 in U.S. Appl. No. 10/436,394.
Notice of Allowance issued Apr. 22, 2008 in U.S. Appl. No. 11/714,625.
Notice of Allowance issued Aug. 29, 2006 in U.S. Appl. No. 10/733,619.
Notice of Allowance issued Apr. 7, 2008 in U.S. Appl. No. 11/604,449.
Notice of Allowance issued Aug. 21, 2006 in U.S. Appl. No. 10/802,171.
Notice of Allowance issued Mar. 7, 2006 in U.S. Appl. No. 11/013,094.
Notice of Allowance issued Jul. 19, 2007 in U.S. Appl. No. 11/284,008.
Notice of Allowance issued Dec. 17, 2008 in U.S. Appl. No. 11/700,521.
Notice of Allowance issued Nov. 30, 2007 in U.S. Appl. No. 10/862,646.
Notice of Allowance issued Mar. 20, 2006 in U.S. Appl. No. 29/226,684.
Notice of Allowance issued Apr. 20, 2009 in U.S. Appl. No. 11/604,502.
Non-Final Office Action issued Jan. 30, 2009 in U.S. Appl. No. 12/126,481.
Final Office Action issued Apr. 10, 2009 in U.S. Appl. No. 12/126,481.
Advisory Action issued Jun. 18, 2009 in U.S. Appl. No. 12/126,481.
Non-Final Office Action issued Apr. 9, 2009 in U.S. Appl. No. 12/255,476.
ISR and Written Opinion issued Jun. 30, 2009 in PCT/US2009/044581.

* cited by examiner

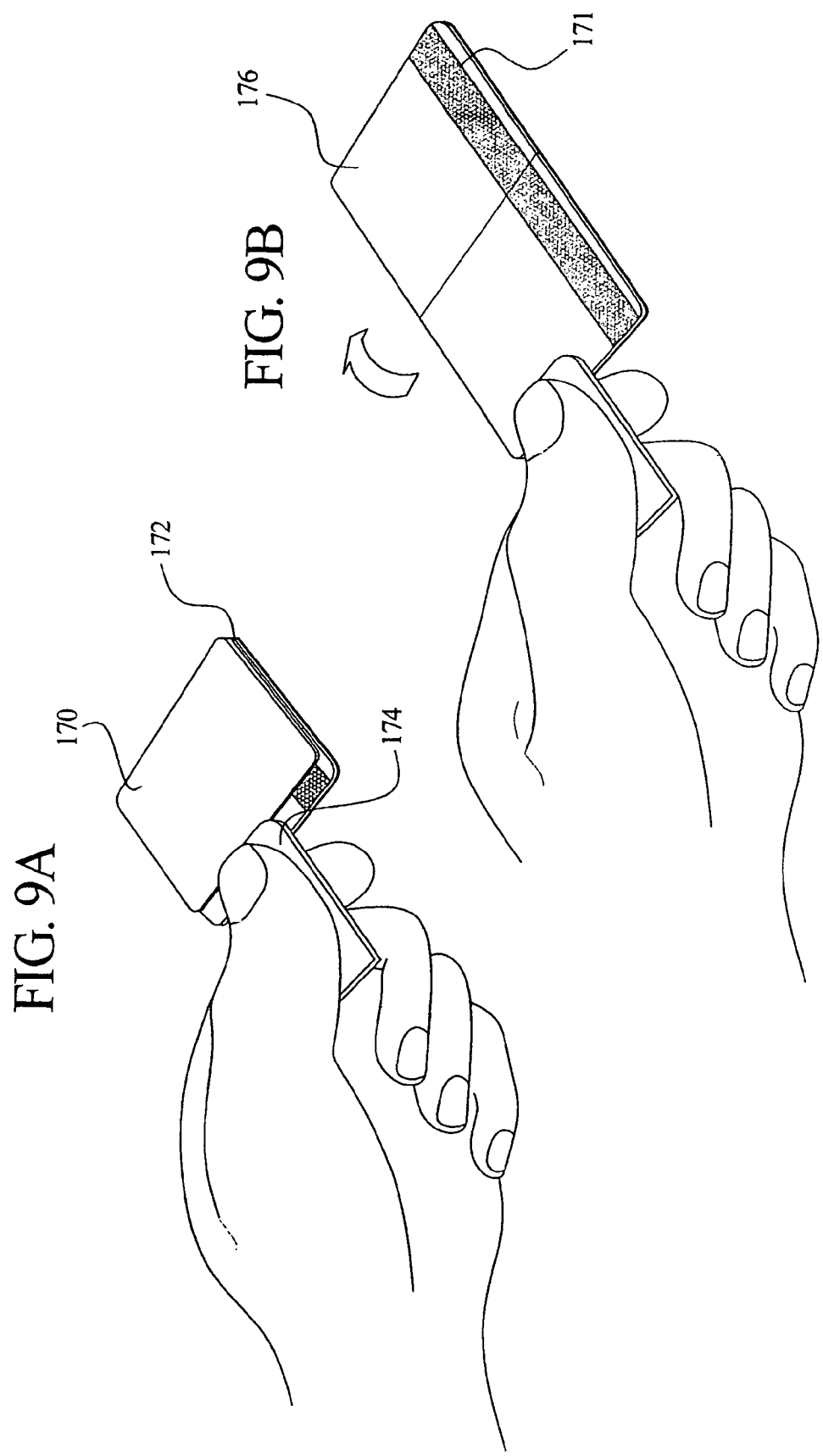

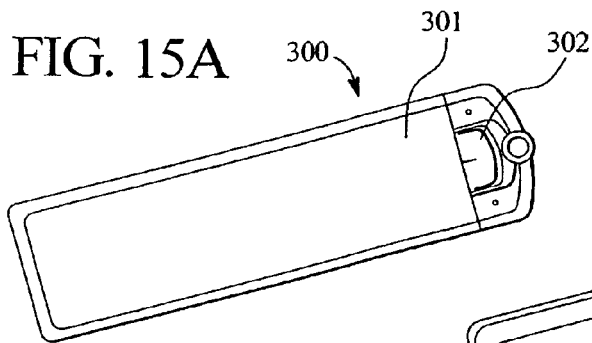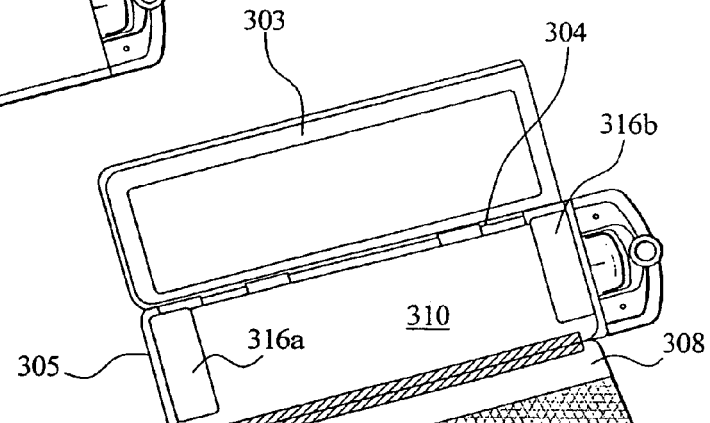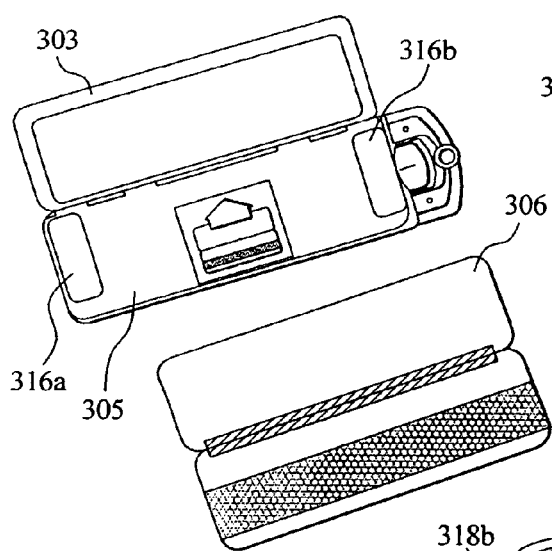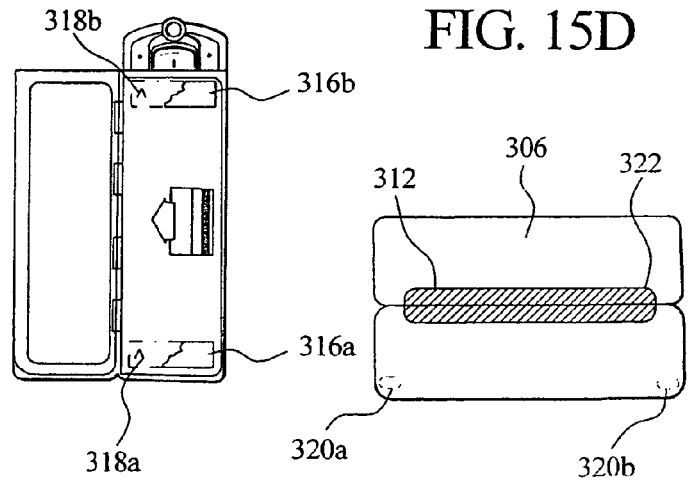
FIG. 15A
FIG. 15B
FIG. 15C
FIG. 15D

FOLDABLE TRANSACTION CARDS AND METHODS OF MAKING THE SAME

CROSS-REFERENCE TO RELATED APPLICATIONS

The present application is a divisional of, and claims priority to, U.S. patent application Ser. No. 11/604,502. U.S. patent application Ser. No. 11/604,502 is a continuation-in-part application of U.S. patent application Ser. No. 10/733,619, filed on Dec. 10, 2003. U.S. patent application Ser. No. 10/733,619 is a continuation-in-part of U.S. patent application Ser. No. 10/436,394, filed on May 12, 2003. U.S. patent application Ser. No. 10/436,394 claimed priority to U.S. Provisional Patent Application No. 60/442,991, filed on Jan. 28, 2003. U.S. patent application Ser. No. 10/436,394 further claimed priority to U.S. Provisional Patent Application No. 60/424,592, filed on Nov. 7, 2002. All these applications are incorporated by reference herein in their entirety.

FIELD OF THE INVENTION

Conveniently accessible transaction cards are provided wherein transaction cards are foldable and provided within cases, housings or carriers. Moreover, methods of making foldable transaction cards are provided.

BACKGROUND OF THE INVENTION

It is generally known to utilize transaction cards for providing a means for purchasing goods or services without the use of paper money or coinage. Specifically, transaction cards may represent credit, whereby a user of the transaction card may present the card in lieu of the paper money or coinage. Transaction cards may be debit cards, whereby electronic money, such as money stored in an account, is removed from the account each time that the transaction card is used. In addition, transaction cards may be stored-value instruments and have a certain amount of money, or other valuable commodity, recorded thereon, whereby a user of the transaction card may remove the money directly from the transaction card. For example, retail stores now offer cards that may be purchased for a certain amount of money. That amount, or any other amount, may be represented on the transaction card. When the transaction card is utilized, the amount represented on the card may be reduced until the transaction card cannot be utilized anymore. In addition, other values besides currency may be represented on the transaction card, such as equivalent goods or services.

Transaction cards typically have a magnetic stripe provided, or some other storage device, for storing information relating to the transaction card, such as, a security code, and information relating to an account or an amount of money that the transaction card may represent. For example, if the transaction card is a credit card, the information contained on the magnetic stripe may relate to an account whereby use of the credit card may alert the account to release funds for the purchase of goods or services. Of course, the magnetic stripe or other means may further contain any other information to allow the transaction card to be utilized. The transaction card is typically fed into or through a reader that reads the information contained on the magnetic stripe to extract the information as needed when the transaction card is being used.

The transaction card may further contain other features that allow for the secure and efficient use of the transaction card, such as holographic security devices, signature panels, pictures of the owner of the transaction card, embedded microchips, or any other item or element that may be useful for the transaction card.

Transaction cards are typically sized according to standards set by the International Organization for Standardization (ISO). This means that most transaction cards being utilized are of the same size and dimensions, typically about 2¼ inches by about 3⅜ inches in a generally rectangular configuration. However, a transaction card having dimensions according to this standard may be too big to be stored in a convenient way except loose in a pocket, wallet or purse, or contained within a slot in a wallet or purse allowing the snug fit of the transaction card. Transaction cards are, therefore, highly susceptible to being lost or stolen. Other shapes and sizes would allow the transaction cards to be more easily stored and accessible when needed. For example, transaction cards may be securable to a securing mechanism, such as a keychain or other like device.

A need exists, therefore, for a transaction card having the capability of being stored in smaller areas than are currently allowed. For example, a need exists for a transaction card that may be clipped or otherwise attached to a keychain, or some other mechanism for securing the transaction card to another item, yet is small enough to remain inconspicuous and compact, but handy. Further, a need exists for a transaction card having the above-noted advantages and further that maintains the information or other features typically disposed on or within a transaction card. Still further, a need exists for a case or housing for holding and/or storing the foldable transaction card contained therein.

Moreover, a need exists for a transaction card that may be useful by being storable and easily accessible when needed. A need exists for a transaction card that may be useful by itself, or may be disposed within a case, housing or carrier to protect and store the transaction card. In addition, the transaction card or housing, case or carrier may be attachable to a securing mechanism, such as a keychain or other like securing mechanism.

In addition, a need exists for a foldable transaction card that is resilient to every day wear-and-tear. For example, a need exists for a foldable transaction card that may be folded and unfolded a plurality of times without significant loss in folding ability. In addition, a need exists for a foldable transaction card that may be folded a plurality of ways, whereby the transaction card may be foldable so as to enclose the front surface and/or the back surface of the transaction card. Further, a need exists for a foldable transaction card that may be incorporated into a case, housing or carrier, wherein said foldable transaction card may be folded within said case, housing or carrier for protecting, holding and/or storing said foldable transaction card.

SUMMARY OF THE INVENTION

The present invention relates to a transaction card having one or more fold lines therein to provide a compact and easily stored transaction card. Moreover, the present invention relates to foldable transaction cards and methods of making the same. More specifically, the present invention relates to transaction cards foldable in one or both directions and/or provided within a case or housing for protecting, holding and/or storing said transaction card therein.

To this end, in an embodiment of the present invention, a transaction card comprises a first section and a second section; and an internal hinge material disposed between the first section and the second section.

In an another embodiment of the present invention, a transaction card system comprises a foldable transaction card wherein said foldable transaction card comprises a first section, a second section, and an internal hinge material disposed between the first section and the second section; and a carrier for disposing said foldable transaction card therein.

In a still further embodiment of the present invention, a method of making a transaction card comprises providing a first subassembly; providing a second subassembly; disposing a hinge material on a surface of the second subassembly; laminating the first subassembly together with the second subassembly having the hinge material disposed on a surface thereof to form an assembly such that the hinge material is disposed internally within the assembly; and removing the transaction card from the assembly.

A method of making a transaction card is provided herein comprising laminating a first layer comprising an upper surface and a lower surface to an internal hinge layer comprising a first surface and a second surface such that a first portion of the first surface of the internal hinge layer is in direct contact with the lower surface of the first layer and laminating a second layer comprising an upper surface and a lower surface to the internal hinge layer such that a first portion of the second surface of the internal hinge layer is in direct contact with the upper surface of the second layer and creating a folding locus on a third portion of the internal hinge layer that is not in direct contact with the first layer and the second layer, the folding locus permitting folding of the transaction card at the folding locus.

It may, therefore, be an advantage to provide a transaction card that is foldable so as to be highly compact so that the transaction card may be stored in small areas. Further, it may be an advantage of the present invention to provide a transaction card that may be provided by itself, disposed within a housing, case or carrier, or attached to another item via a securing means, such as a ring or chain.

Further, it may be an advantage to provide a transaction card that may be attached to a keychain, yet still remain small and compact. Therefore, an advantage of the present invention may be that the transaction card may be small enough to be inconspicuous and be secured to another item thereby minimizing the chance that the transaction card will be misplaced, lost or stolen.

It may be further an advantage to provide a transaction card that is foldable and held and/or stored within a case or housing that comprises other features typically found on or within a transaction card, such as security devices, embedded microchips, or magnetic stripes having information stored thereon or the like.

Moreover, it may be an advantage to provide a foldable transaction card that may be folded and unfolded a plurality of times without significant loss in folding ability. In addition, it may be an advantage to provide a foldable transaction card that may be folded in both directions. For example, the foldable transaction card of the present invention may be folded such that the front surface is enclosed and protected when the foldable transaction card is folded. The foldable transaction card of the present invention may be folded such that the back surface is enclosed and protected when the foldable transaction card is folded. Moreover, it may be an advantage of the present invention to provide a foldable transaction card that is protected, held and/or stored within a case or housing.

Additional features and advantages of various examples are described in, and will be apparent from, the detailed description of various embodiments and from the drawings.

BRIEF DESCRIPTION OF THE DRAWINGS

FIGS. 9A and 9B illustrate a foldable transaction card having a spring-loaded clip for holding said foldable transaction card in a folded state in an embodiment of the present invention.

FIGS. 15A to 15D illustrate an embodiment of a foldable transaction card system.

DETAILED DESCRIPTION

The present invention relates to a transaction card having one or more folds therein to provide a compact and easily stored transaction card. Moreover, the present invention relates to a foldable transaction card having one or more holes or apertures therein for holding a keychain, or other device for attaching the transaction card to another item, such as a set of keys, a wallet, or other item. Moreover, a transaction card system is provided comprising a foldable transaction card and a case or housing for holding and/or storing the foldable transaction card.

Figure 1A:
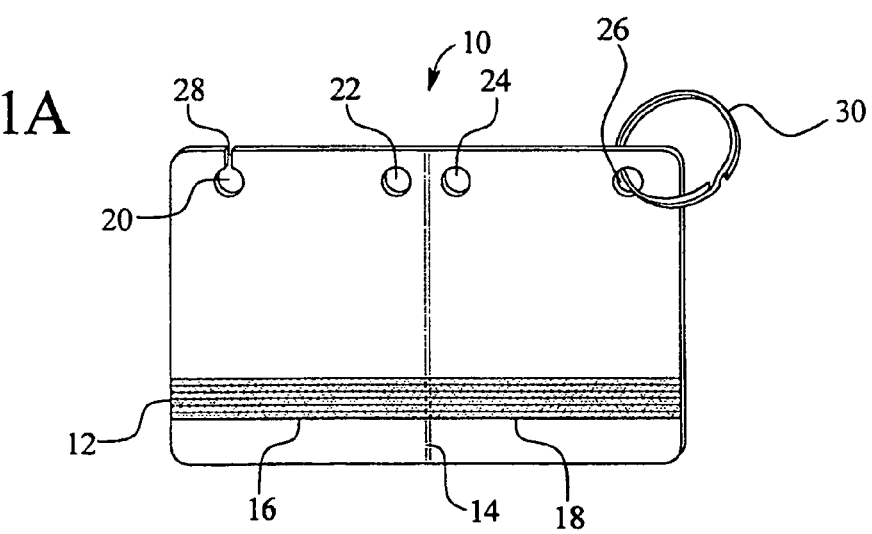
FIGS. 1A-1C illustrate a transaction card that is transversely foldable and having apertures for securing a ring or a keychain thereto.
Figure 1B:
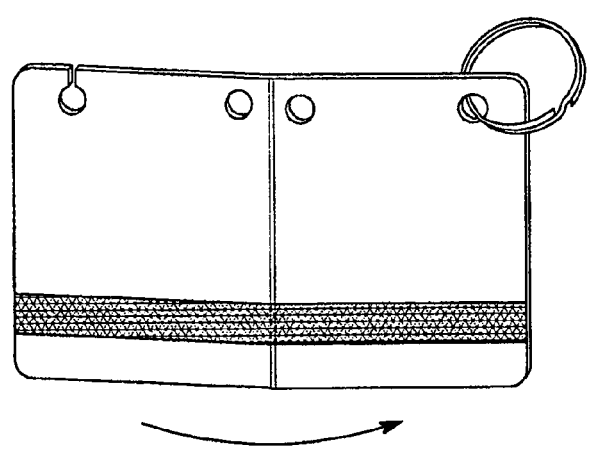
Figure 1C:
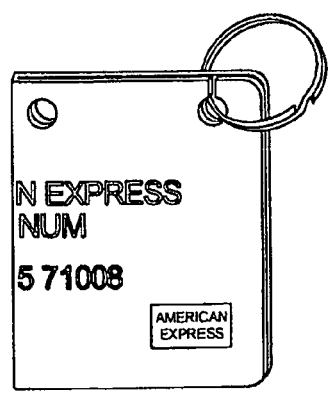

Referring now to FIGS. 1A-1C, a first example of the present invention is illustrated. FIGS. 1A-1C illustrates a foldable transaction card 10, shown generically as merely having a magnetic stripe 12. Other features not shown, however, may be provided on the transaction card, such as a signature panel, an embedded microchip, a holographic image, or the like. These features may allow the transaction card to function more easily, efficiently, and/or more securely.

Of course, transaction card 10 typically comprises a plurality of layers (not shown) to form the rigid card. For example, transaction cards typically include inner layers of a polymeric material to provide the transaction card with thickness and bulk. In addition, outer layers are typically provided comprising a polymeric material that protects the inner layers of the transaction card. In addition, the polymeric material of the outer layers may provide rigidity and further may add to the thickness of the transaction card. Transaction card 10, and other transaction cards described herein, may be made from any generally known material typically used for transaction cards, such as, for example, polyvinylchloride (PVC) and polypropylene (PP). Typically, transaction cards such as the ones described herein have multiple layers of polymeric materials. For example, a typical card may have one or more internal layers of PVC or PP, and outer layers of polyethylene terephthalate (PET) for rigidity and strength.

Transaction card 10 has a fold line 14 that allows transaction card 10 to be folded, as illustrated in FIGS. 1B and 1C.

The fold line may be made by scoring the outer layers of transaction card 10 via a scoring mechanism, such as a blade, laser beam or other scoring mechanism and allowing the inner layers to act as a hinge when the transaction card is folded. Transaction card 10 may include a reinforcing material at the location of fold line 14 so that fold line 14 does not pull apart, or otherwise destroy transaction card 10 when folded. Of course, other materials may be utilized in transaction card 10 to act as a hinge at fold line 14, and the invention should not be limited in this regard. Moreover, fold line 14 may comprise a break between the two halves of transaction card 10 whereby a strip may be disposed on one or both sides of transaction card 10 for holding the two halves together to form a hinge. The strip may be disposed within transaction card 10 for holding the two halves together to form the hinge. The strip may be a fabric or a thermoplastic material, such as an elastomeric material, that may be stretched when the transaction card is folded, yet retain its shape when transaction card 10 is unfolded.

Magnetic stripe 12 may contain a material for storing information that may be read by a magnetic reader. Typically, magnetic stripe 12 contains a series of digits that the magnetic card reader may read to obtain information about the account that the transaction card is associated with, or otherwise to obtain information relating to the amount of money or other equivalent good or service represented by transaction card 10. Magnetic stripe 12 of the present embodiment is, necessarily, split into two halves because of fold line 14 that bisects magnetic stripe 12. Therefore, the information contained on magnetic stripe 12 must be readable by a magnetic card reader at a point-of-sale machine that accounts for fold line 14. This may mean that some or all of the information should be contained on a first section 16 of magnetic stripe 12, and the rest or a duplicate of the information should be contained on a second section 18 of magnetic stripe 12. Therefore, the information contained on magnetic stripe 12 may be readable by the magnetic stripe reader. A magnetic stripe may be provided parallel with one of the short ends of the transaction card, as illustrated in FIGS. 2A-2C, below.

Disposed in transaction card 10 may be a plurality of apertures 20, 22, 24 and 26 that may be utilized to attach transaction card 10 to a securing means, such as a ring 28, as illustrated in FIGS. 1A-1C. Of course, any other securing mechanism, such as a chain or string, for example, may be utilized and the invention should not be limited as herein described. The securing mechanism may be provided in any of the apertures as needed. Aperture 20 may include a channel 28 that allows a securing mechanism to be slipped into the aperture 20. For example, as illustrated in FIG. 1C, ring 28 may be provided within aperture 26, but may also fit within aperture 20 through channel 28 so that transaction card 10 may stay folded. Ring 28 may be provided through one or both of apertures 22, 24. If ring 28 is provided through both of apertures 22 and 24, ring 28 may be configured in such a way as to allow transaction card 10 to be unfolded when used.

Figure 2A:
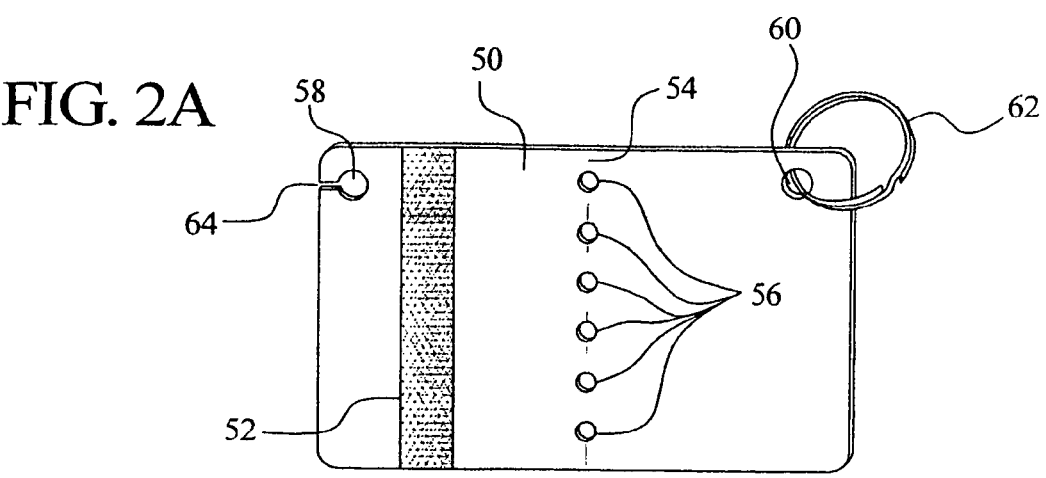
FIGS. 2A-2C illustrate another transaction card that is transversely foldable in an embodiment of the present invention.
Figure 2B:
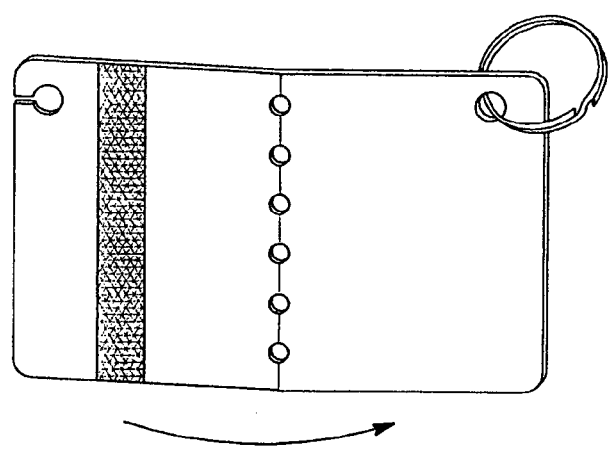
Figure 2C:
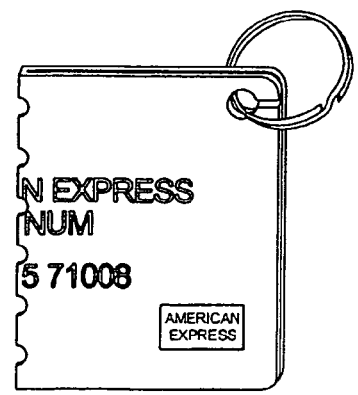

FIGS. 2A-2C illustrate an example of a foldable transaction card 50 having a magnetic stripe 52 that is parallel to a short side of transaction card 50. Transaction card 50 may be very similar to transaction card 10, as described above and may have a fold line 54 that divides transaction card 50 into two halves. More than one fold line may be provided in transaction card 50 for dividing the card into more than just two halves, as described below. Transaction card 50 may further have a plurality of holes 56 provided along fold line 54 thereby giving transaction card 50 a distinctive appearance, and further aiding in allowing transaction card 50 to be folded along fold line 54.

Transaction card 50 may further have apertures 58, 60 for a securing mechanism, such as a ring 62, or other securing mechanism, such as a chain or a string, for example. Ring 62 may be provided through aperture 60, and may further be clipped into aperture 58 after transaction card 50 has been folded, as illustrated in FIG. 2C. To allow ring 62 to be clipped into aperture 58, aperture 58 may include a channel 64.

Figure 3A:
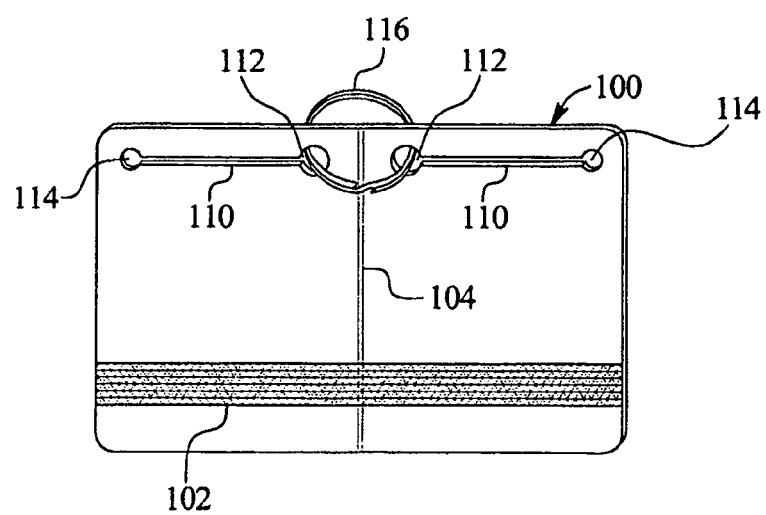
FIGS. 3A-3D illustrate another transaction card that is transversely foldable having an aperture and slot for a ring or keychain in a further embodiment of the present invention.
Figure 3B:
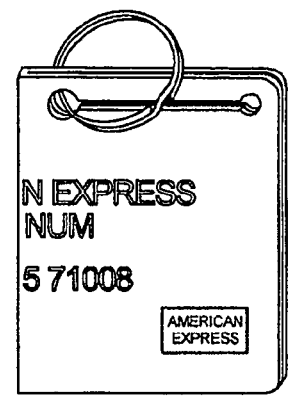
Figure 3C:
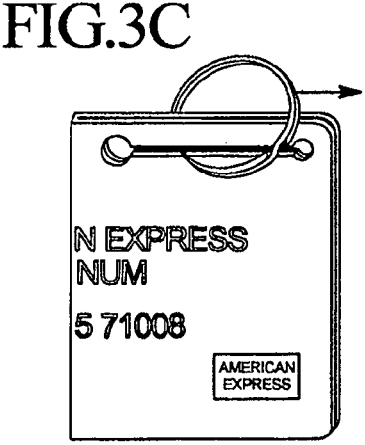
Figure 3D:
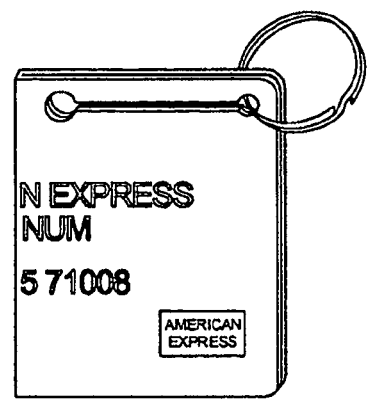

FIGS. 3A-3D illustrate a still further example of a transaction card 100 having similar features to transaction card 10 of FIGS. 1A-1C. For example, transaction card 100 includes a magnetic stripe 102 and a fold line 104 allowing transaction card 100 to be folded, thereby making transaction card 100 smaller and more compact. Each half of transaction card 100 may include a slit 110 connecting two apertures 112 and 114. A ring 116, or other securing means, may be provided through apertures 112 such that, when folded, as illustrated in FIGS. 3B-3D, ring 116 may translate through slits 110 to rest in aperture 114, thereby keeping the two halves of transaction card 100 together when folded. If transaction card 100 is to be opened, ring 116 is merely translated back to apertures 112 and transaction card 100 is unfolded.

Figure 4A:
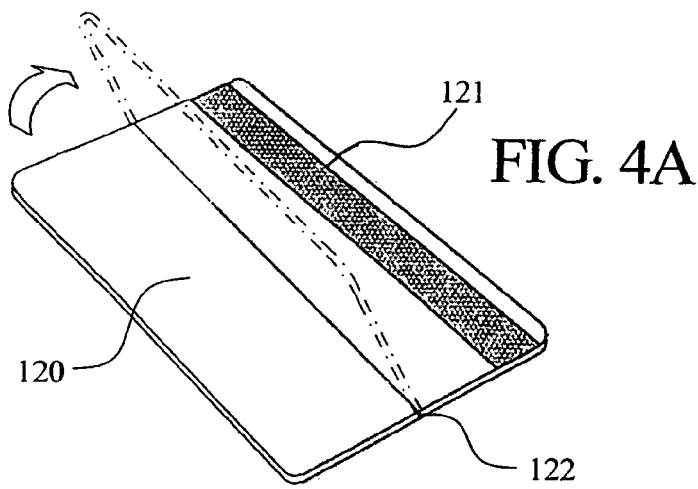
FIGS. 4A and 4B illustrate a transaction card foldable longitudinally and parallel to the long edges of the transaction card in a further embodiment of the present invention.
Figure 4B:
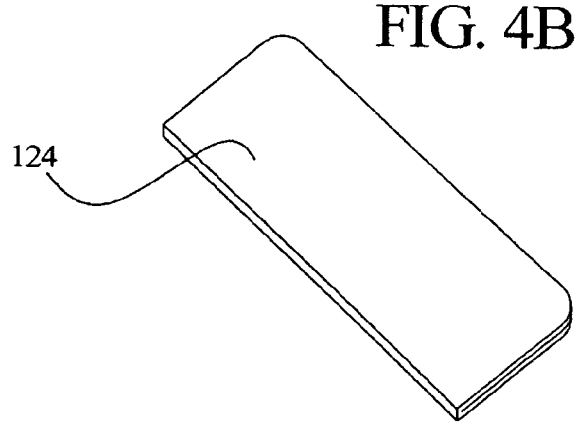

FIGS. 4A-4B illustrate another example of a transaction card 120 having a magnetic stripe 121 and a fold line 122 disposed longitudinally through the center of transaction card 120 such that when transaction card 120 is folded along fold line 122, a folded transaction card 124 is created, as shown in FIG. 4B, which thereby protects magnetic stripe 121. It should be noted that a smaller-sized transaction card may be created even if the fold line is not disposed longitudinally through the center of the transaction card 120.

Figure 5A:
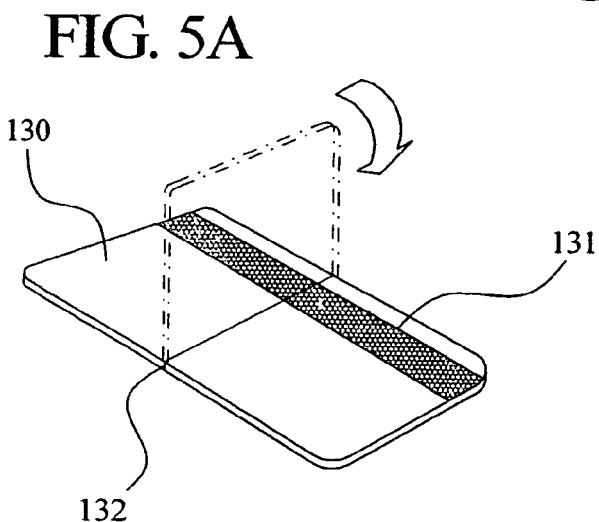
FIGS. 5A and 5B illustrate a smaller-sized transaction card that is transversely foldable.
Figure 5B:
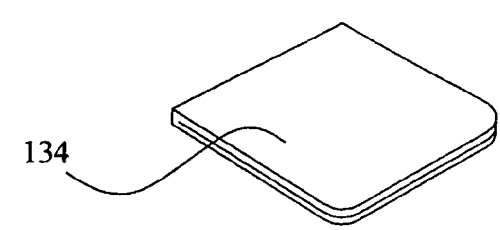

FIGS. 5A-5B illustrate another example of a miniature transaction card 130 having a magnetic stripe 131 and a fold line 132 disposed transversely through the center of transaction card 130 such that when transaction card 130 is folded along fold line 132, a folded miniature transaction card 134 is created, as illustrated in FIG. 5B. The size of transaction card 130 may be smaller than a normally-sized transaction card. Smaller-sized transaction cards are generally described below with reference to FIGS. 21-28. It should be noted that a smaller-sized transaction card may be created even if a fold line is not disposed transversely through the center of transaction card 130.

Figure 6A:
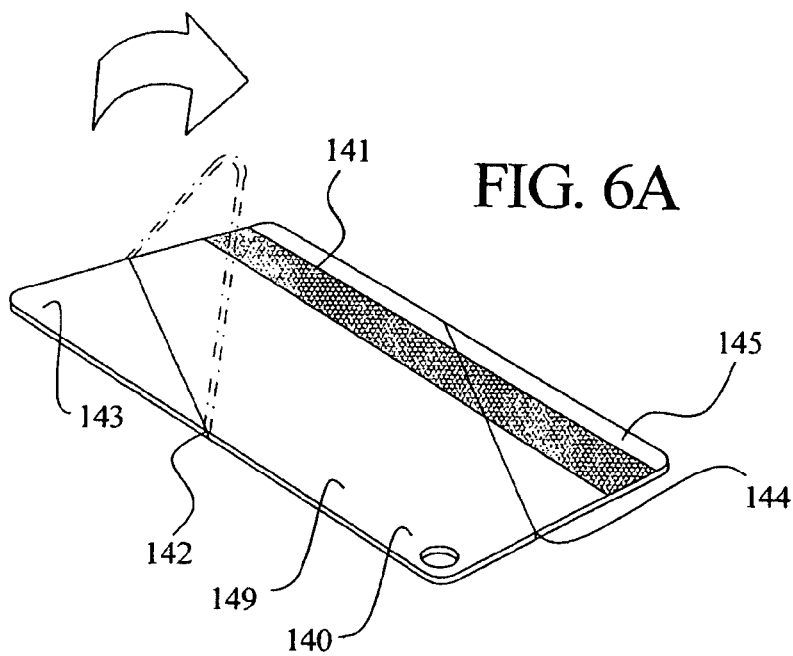
FIGS. 6A-6C illustrate a transaction card having fold lines disposed at angles other than right angles relative to the edges of the transaction card but may be unfolded to be utilized within a point-of-sale machine.
Figure 6B:
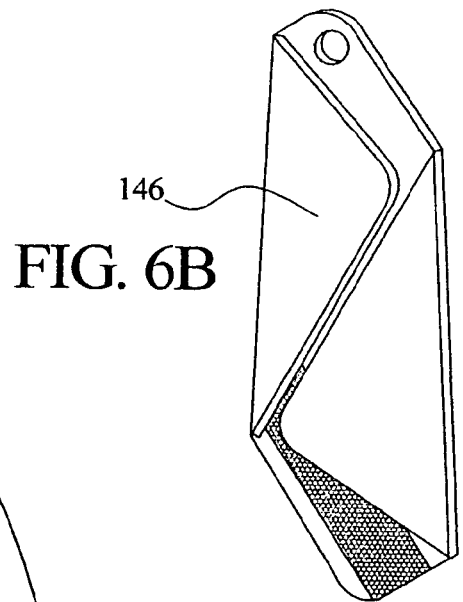
Figure 6C:
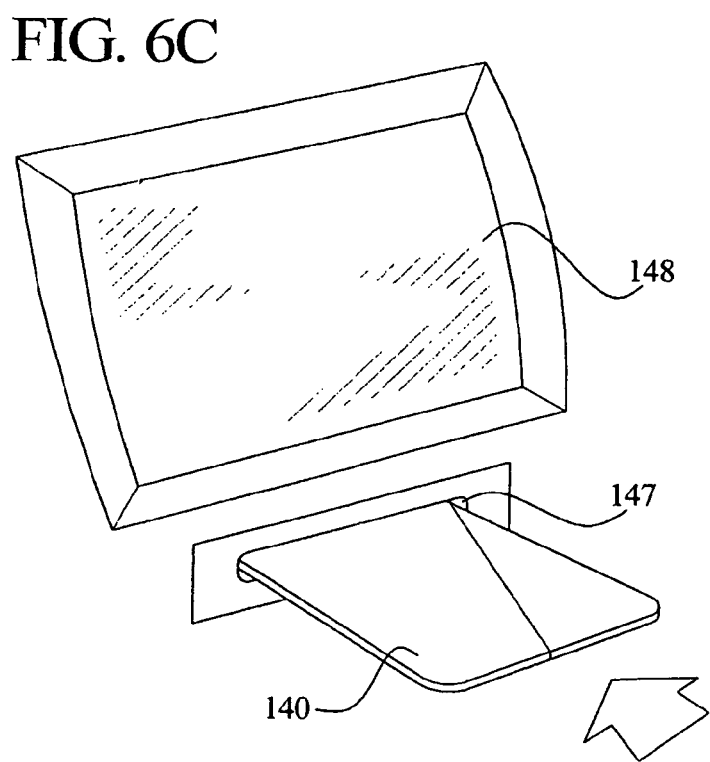

FIGS. 6A-6C illustrate another example of a foldable transaction card 140 having a magnetic stripe 141 and two fold lines 142, 144 disposed parallel to each other but diagonal relative to the edges of transaction card 140. Fold lines 142, 144 allow transaction card 140 to be folded such that flaps 143, 145 fold over section 149 to form a folded transaction card 146, as illustrated in FIG. 6B, which substantially protects magnetic stripe 141. When unfolded, transaction card 140 may be inserted into a slot 147 of an automatic teller machine (ATM) without difficulty, as illustrated in FIG. 6C.

Figure 7A:
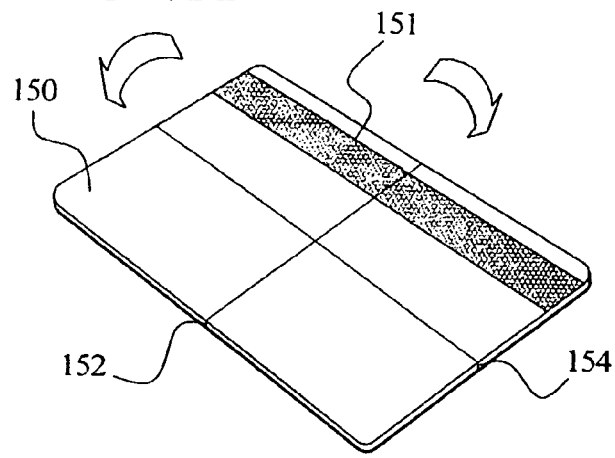
FIGS. 7A and 7B illustrate a transaction card foldable once in a longitudinal direction, and once in a transverse direction.
Figure 7B:
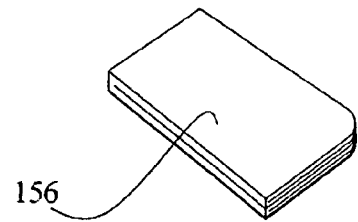

FIGS. 7A-7B illustrate another example of a foldable transaction card 150 having a magnetic stripe 151 and two fold lines 152, 154 that are disposed both longitudinally and transversely across transaction card 150, thereby being disposed perpendicular to each other. Fold lines 152, 154 allow transaction card 150 to be folded twice to form a folded transaction card 156 that protects magnetic stripe 151, as illustrated in FIG. 7B.

Figure 8A:
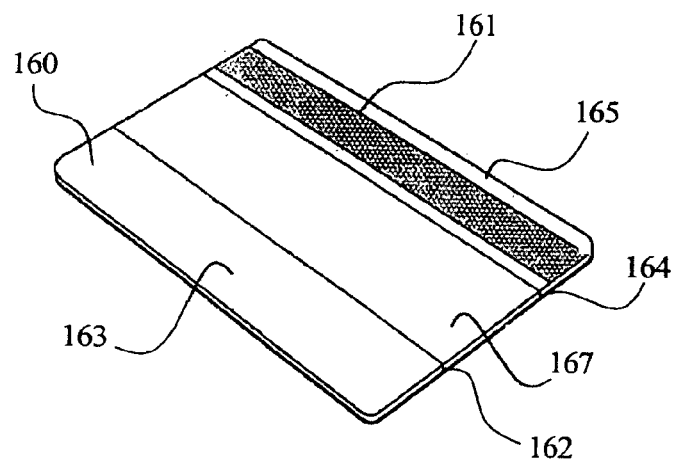
FIGS. 8A and 8B illustrate a transaction card having two longitudinal fold lines disposed parallel to edges of said transaction card thereby forming a foldable transaction card having three sections.
Figure 8B:
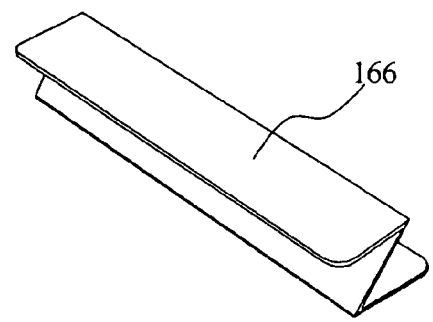

FIGS. 8A and 8B illustrate an example of a foldable transaction card 160 having a magnetic stripe 161 and two fold lines 162, 164 that are disposed longitudinally, but subdivide transaction card 160 into three sections: a first section 163, a second section 165 and a third section 167. Transaction card 160 may have two fold lines that are disposed transversely across transaction card 160 but also subdivide transaction card 160 into thirds (not shown). Fold lines 162, 164 allow transaction card 160 to be folded twice to form a folded transaction card 166 that is small and compact and further that protects the magnetic stripe. Folded transaction card 166 may be folded as shown in FIG. 8B, which shows transaction card 160 such that outer sections 163, 165 of transaction card 160 are folded inwardly on opposite sides of third section 167 in a "Z" configuration. Transaction card 160 may be folded such that first and second sections 163, 165 of transaction card 160 may be folded inwardly on the same side of the third section 167 (not shown). Fold lines 162, 164 may not subdivide transaction card 160 into equal thirds, but subdivide transaction card 160 into three unequal sections. In addition, additional fold lines may be provided such that transaction card 160 may be subdivided into four or more equal or unequal portions.

As an example, a transaction card (not shown), similar to the cards described above with respect to FIGS. 1A-8, may have a fold line disposed between at least first and second sections. Further, the transaction card may have a snap, button or other mechanism (collectively a "snap") which may hold the folded transaction card in a first engaged or locked position (collectively, the "engaged position"). The transaction card may not be usably accessible when the snap is in the engaged position. When the snap is actuated, the snap disengages or unlocks (collectively, the "dis-engaged position") and the second section of the transaction card may unfold into an "unfolded position". As noted, the fold line may be disposed either longitudinally or transversely across the face of the transaction card.

In the unfolded position, the transaction card may become a full-sized financial transaction card and/or a card that may be used as a form of payment to conduct transactions and in standard financial transaction card readers, such as those at retail point-of-sale locations or ATM (cash) machines. In various embodiments, when the second section is folded and is otherwise inaccessible, the external surface area of the card is approximately half compared to when the second section is usably accessible in the unfolded position. In various embodiments, the transaction card may be refolded by folding the first and second sections in relation to one another and re-engaging the snap to keep the card folded. To allow folding, the first and second sections may be coupled by a flexible material or hinge. In various embodiments, the card may have a plurality of folding sections.

FIGS. 9A and 9B illustrate an example of a foldable transaction card 170 having two sections 176, 178 separated by a fold line 172. Transaction card 170 may be maintained in a folded stated via a spring-loaded clip 174. By releasing spring-loaded clip 174, transaction card 170 may unfold along fold line 172 to form an unfolded transaction card 179 having a visible and usable magnetic stripe 171. Spring-loaded clip 174 may be disposed on a side 177 of section 176 that forms a side of transaction card 170 when in the unfolded state.

Figure 10:
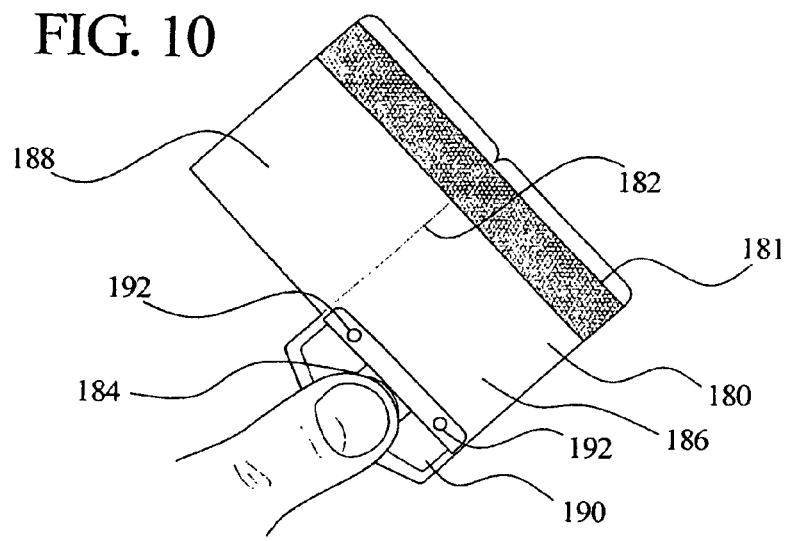
FIG. 10 illustrates a foldable transaction card having a spring-loaded clip and a holder for attaching to a ring or keychain in a further embodiment of the present invention.

Moreover, FIG. 10 illustrates a foldable transaction card 180 having two sections 186, 188 separated by a fold line 182. Transaction card 180 may be maintained in the folded stated via a spring-loaded clip 184. The transaction card 180 may be similar to transaction card 170, as illustrated in FIGS. 9A and 9B, except clip 184 may be disposed on a side 187 of section 186 that forms the bottom of transaction card 180 (opposite magnetic stripe 181). Spring-loaded clip 184 may be interconnected with a holder 190 having spring-loaded clip 184 disposed thereon. Transaction card 180 may be interconnected with holder 190 via pins 192, or via any other means that holds transaction card 180 to holder 190. Transaction card 180 may be removable from holder 190 so that transaction card 180 may be usable in any point-of-service machine, such as a payment machine or an automatic teller machine.

Transaction card 180 may be permanently attached to holder 190. Holder 190 may further be attachable to a key chain, or the like, such that keys or the like may be removably attached to holder 190, thereby minimizing the chances that transaction card 180 may be misplaced. In addition, transaction card 180 may be easily accessible if attached to a keychain or the like.

On external surfaces of transaction card 180 (on the face of transaction card opposite magnetic strip 181) there may be disposed a protective material, such as a metallized surface, or other surface, that protects transaction card 180 when transaction card 180 is in the folded state. Specifically, a material such as aluminized polyester may be utilized as a coating or external layer of transaction card 180. As shown in FIG. 10, magnetic stripe 181 may be disposed on an inside surface of transaction card 180 so that when folded, a magnetic stripe 181 is protected.

Figure 11A:
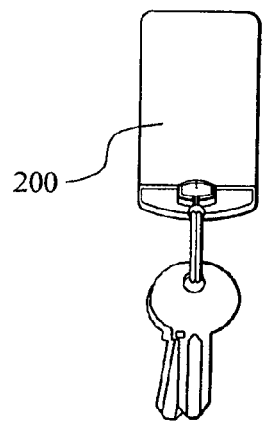
FIGS. 11A and 11B illustrate a transaction card foldable into thirds and having a spring-loaded clip and a holder for attaching to a ring or keychain in a still further embodiment of the present invention.
Figure 11B:
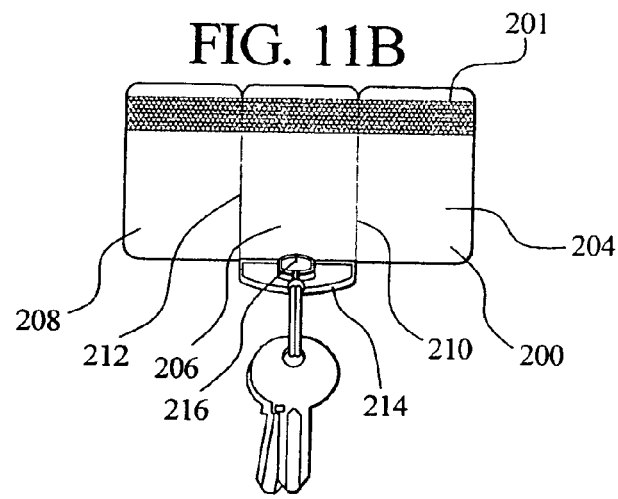

FIGS. 11A and 11B illustrate a still further embodiment of the present invention that is similar to the example shown in FIG. 10. FIGS. 11A and 11B show a transaction card 200 having a magnetic stripe 201 that may have a folded state (as shown in FIG. 11A) or an unfolded state (as shown in FIG. 11B). Transaction card 200 may have three sections 204, 206 and 208 that are separated by fold lines 210, 212. Outer sections 204, 208 may fold inwardly toward center section 206 to form folded transaction card 202, thereby protecting magnetic stripe 201. In addition, the outside surface of transaction card 200 (i.e., the surface opposite the magnetic stripe) may be made from a material that protects transaction card 200, such as a metallized material. For example, the outside layer of transaction card 200 may be made from aluminized polyester.

A holder 214 may be disposed on transaction card 200 on central section 206, such that when folded together to form the folded state, a spring-loaded clip 216 may hold transaction card 200 together in the folded state. Although the present example is shown with holder 214 disposed on central section 206, holder 214 may be disposed on any of sections 204, 206 or 208 such that when folded, holder 214 may hold transaction card 100 in a folded state with spring-loaded clip 216. When actuated, spring-loaded clip 216 allows outer sections 204, 208 to unfold from central section 206, thereby forming transaction card 200 in the unfolded state. As with transaction card 180, as shown in FIG. 10, transaction card 200 may be detachable from the holder 214 such that transaction card 200 may be utilized in a point-of-sale machine, such as an automatic teller machine.

In another embodiment, the transaction card (not shown) has an associated carrier, holder, case, housing, receptacle, pocket, or sleeve (collectively, the "carrier") that may fold in relation with the transaction card and in which the transaction card may be enclosed in whole or in part. The carrier itself may have a snap in an engaged or locked position such that in a first position, a second section of the carrier is folded in relation to a first section of the carrier (the "folded position of the carrier"), such that the transaction card is not usably accessible. When the carrier snap is actuated, the snap disengages or unlocks and the carrier second section unfolds in relation to the carrier first section, making accessible a foldable transaction card that simultaneously unfolds in relation to the carrier. The transaction card may be coupled to the carrier in a manner that allows it to be attached or detached. The carrier, in order to fold, may also have at least first and second sections coupled by a flexible material or hinge.

Figure 12A:
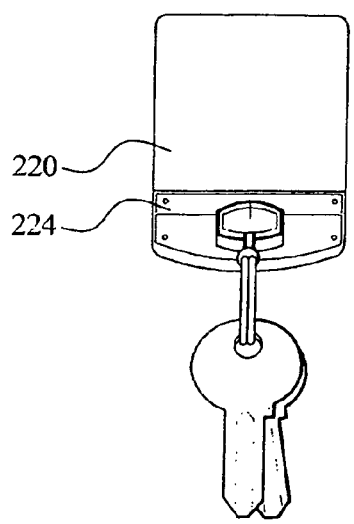
FIGS. 12A and 12B illustrate a foldable transaction card disposed in a foldable carrier, the foldable transaction card further having a spring-loaded clip and a holder for attaching to a ring or keychain in a still further embodiment of the present invention.
Figure 12B:
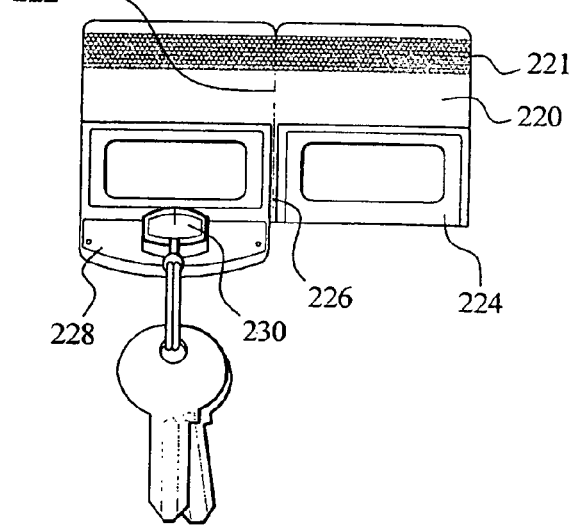

An example of this is shown in FIGS. 12A and 12B, which shows a transaction card 220 having a magnetic stripe 221 that may be in an unfolded state (as shown in FIG. 12B) or a folded state (as shown in FIG. 12A) due to a fold line or hinge 222. Transaction card 220 may be disposed within a carrier 224 that may also have a fold line or hinge 226. Both transaction card 220 and carrier 224 may fold via fold lines 222 and 226, respectively, to allow transaction card 220 to be disposed in the folded state, as illustrated in FIG. 12A. Further, transaction card 220, which is disposed within carrier 224, may be interconnected with a holder 228 having a spring-loaded clip 230 which may hold both carrier 224 and transaction card 220 in the folded state. When transaction card 220 is in the folded state and clip 230 is actuated, transaction card 220 and carrier 224 may be unfolded. When transaction card 220 and carrier 224 are folded, spring-loaded clip 230 may lock transaction card 220 in the folded state.

Both transaction card 220 and carrier 224 may be detachable from holder 228. Transaction card 220 may only be detachable from carrier 224, thereby allowing transaction card 220 to be utilized in point-of-sale machines, such as ATMs. Transaction card 220 may be detachable and removable from carrier 224, which may also be detachable and removable from holder 228.

Although FIGS. 12A and 12B illustrate that carrier 224 only covers a portion of the transaction card 220, carrier 224 may cover more or less of transaction card 220 than shown. For example, carrier 224 may cover the entire surface of transaction card 220 such that transaction card 220 must be fully removable from carrier 224 when utilized.

A transaction card (not shown) may be foldable within a foldable carrier and slidable from the foldable carrier, such that the carrier and the transaction card together form a full-sized transaction card that may be utilized in point-of-sale machines. For example, a spring-loaded clip may be actuated thereby allowing a carrier and transaction card to unfold. Once unfolded, a slot may be exposed that allows a user of the transaction card to push the transaction card out of the carrier, thereby exposing the magnetic stripe. A button may be exposed whereupon actuating the button allows the transaction card to be slid from the carrier. However, the transaction card may not be fully removable from the carrier, but may merely be slidable such that a full-sized transaction card is made from the smaller-sized transaction card and the carrier.

Transaction card 220 may have a metallized surface such that the surface protects transaction card 220. For example, the surface of transaction card 220 may be made from aluminized polyester. Carrier 224 may be metallized, or made from some other protective material, to protect transaction card 220. When folded, transaction card 220 protects magnetic stripe 221.

Figure 13A:
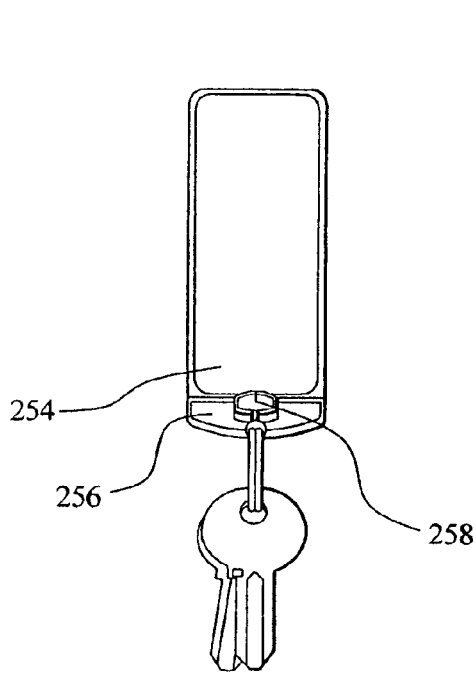
FIGS. 13A and 13B illustrate a foldable transaction card that is longitudinally foldable, the transaction card having a spring-loaded clip and a holder for a ring or keychain.
Figure 13B:
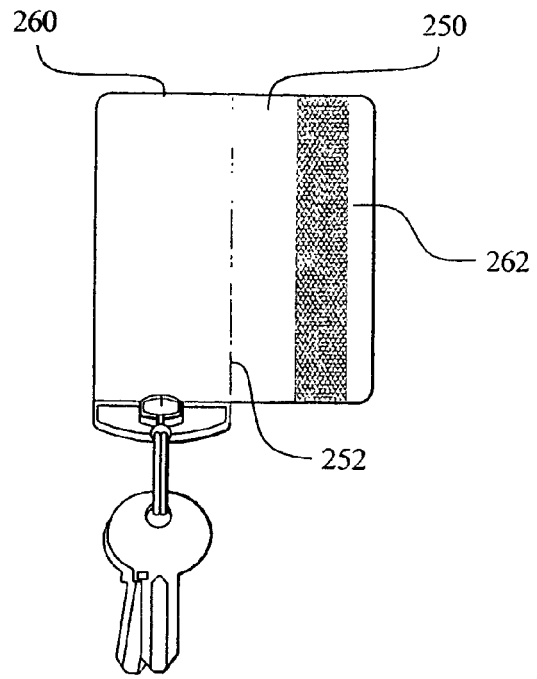

In an example of the present invention, FIGS. 13A and 13B show a foldable transaction card 250 having a magnetic stripe 251 that may be foldable because of a fold line 252. Transaction card 250 may be disposed within a carrier 254 that is interconnected with a holder 256 having a spring-loaded clip 258. Carrier 254 may be formed like a clamshell, in that transaction card 250 form the two halves of carrier 254 and magnetic stripe 251 is exposed when carrier 254 is opened. The bottom portion or first section 260 of carrier 254 may have a portion of transaction card 250 affixed thereto, or may be formed simply as a protective layer on transaction card 250, such as aluminized polyester or the like. Top portion or second section 262 of carrier 254 may also have a portion of transaction card 250 affixed thereto, or may also be formed simply as a protective layer on transaction card 250, such as aluminized polyester or the like. Spring-loaded clip 258 may hold carrier 254 together when carrier 254 is in the folded state.

Figure 14A:
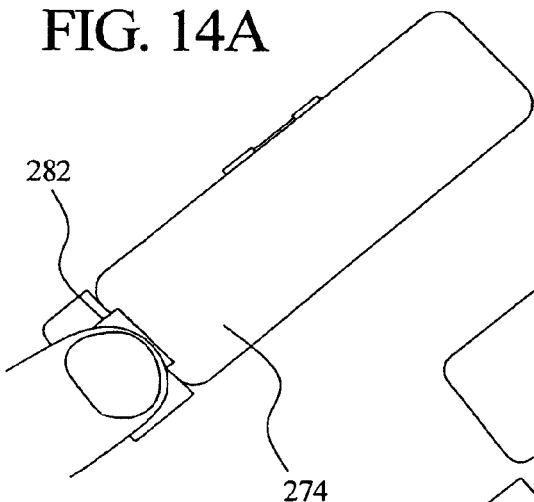
FIGS. 14A and 14B illustrate a longitudinally foldable transaction card disposed within a protective cover.
Figure 14B:
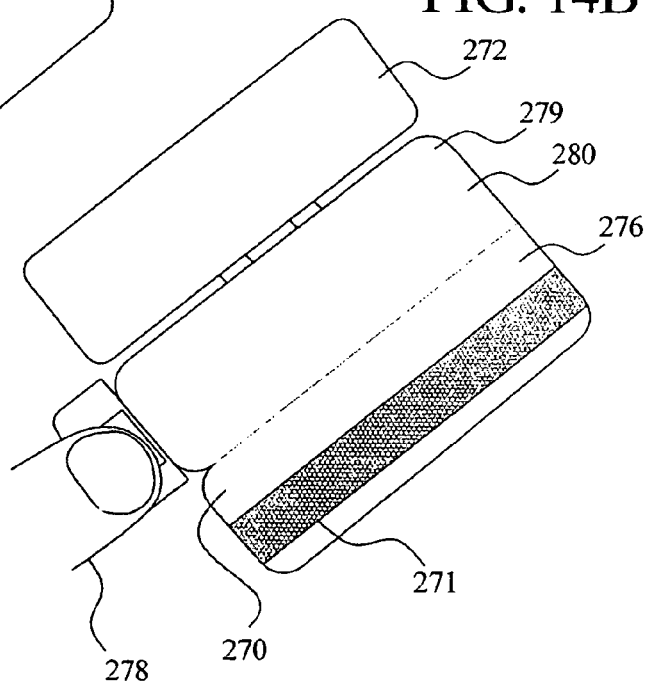

FIGS. 14A and 14B show an example of a transaction card 270 having a magnetic stripe 271 that is similar to transaction card 250, described above in relation to FIGS. 13A and 13B, except transaction card 270 may have be disposed within a carrier 274 having a bottom portion or first section 280 of carrier 274 and a protective cover or second section 272 of carrier 274. Protective cover 272 may be made from metal, plastic or other material that will protect transaction card 270 contained therein. Specifically, transaction card 270 may have a first section 279 and a second section 276, wherein second section 276 has magnetic stripe 271. First section 279 may be integrally formed with or removably attached to bottom portion 280 of carrier 274. If first section 279 is integrally formed with bottom portion 280 of carrier 274, it may have a metallized surface, or other protective surface, to protect first section 279 of transaction card 270 when transaction card 270 is folded and protective cover 272 is folded over bottom portion 280.

When folded together, transaction card 270 may be enclosed within protective cover 272 and bottom portion 280, as shown in FIG. 14A. When utilized, an individual may actuate a spring-loaded clip 282 that allows protective cover 272 to open, thereby exposing transaction card 270 therein. First section 276 may then be unfolded, thereby exposing magnetic stripe 271 to be utilized at a point-of-sale machine.

FIGS. 15A-15D illustrate an example of a foldable transaction card system 300 that is similar to the foldable transaction card system 270, described above with reference to FIGS. 14A-14B. Foldable transaction card system 300 may comprise a carrier 301 and an actuator 302, such as a spring-loaded clip, a button or the like, that may be utilized to open carrier 301, as illustrated in FIG. 15B, via a hinge 304. Hinge 304 may be tensioned to automatically shut when not held open. Hinge 304 may be tensioned to automatically open when actuator 302 is actuated. Carrier 301 includes a lid 303 and a base 305 interconnected via hinge 304.

A foldable transaction card 306 may be contained within carrier 301. Foldable transaction card 306 may have a first section 310 and a second section 308 that may be interconnected via a transaction card hinge 312. Examples of hinges, materials used for hinges, and methods of making foldable transaction cards having the hinges is described below with reference to FIGS. 15D and 29-31.

Of course, transaction card 306 may include a magnetic stripe 314 or other features not shown that are typically contained on a transaction card, such as a holographic security indicator, embossed alpha-numeric characters, graphics, a signature panel, microchip or other like feature.

Transaction card 306 may be disposed within carrier 301 and held within carrier 301 via tracks 316*a*, 316*b* within which transaction card 306 may be slid. In addition, transaction card 306 may be removable from tracks 316*a*, 316*b* so that transaction card 306 may be fully removable from carrier 301, as illustrated in FIG. 15C.

FIG. 15D illustrates carrier 301 having tracks 316*a*, 316*b* cut-away to reveal tabs 318*a*, 318*b* that may be disposed within tracks 316*a*, 316*b* that may engage with transaction card 306 when transaction card 306 is slid within tracks 316*a*, 316*b*. Tabs 318*a*, 318*b* may engage recesses 320*a*, 320*b* that may be disposed on or within first section 310 of transaction card 306. Tabs 318*a*, 318*b* may hold transaction card 306 within carrier 301, thereby keeping transaction card 306 from falling out of carrier 301 when carrier 301 is opened. However, transaction card 306 may be easily removable from carrier 301 when desired by the card user by pulling transaction card 306 from carrier 301 and sliding transaction card 306 out of tracks 316*a*, 316*b*.

Figure 16A:
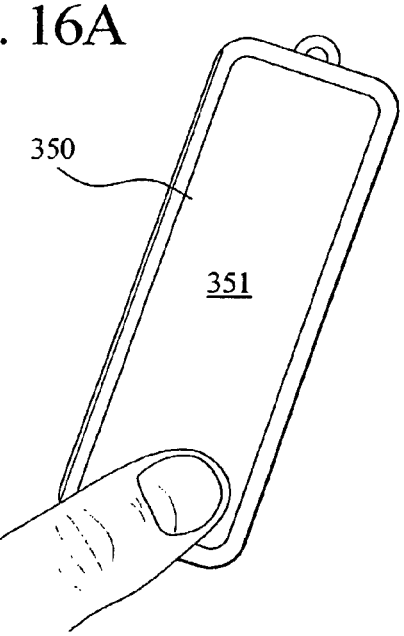
FIGS. 16A to 16C illustrate an embodiment of a foldable transaction card system.
Figure 16B:
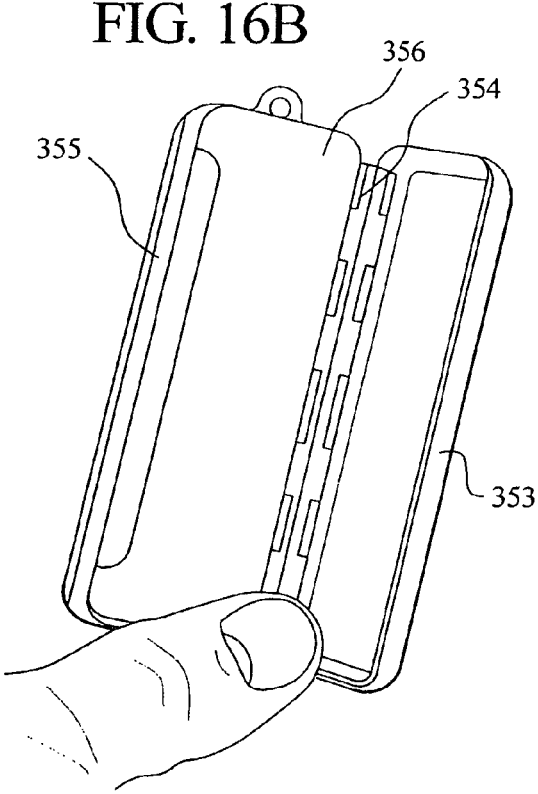
Figure 16C:
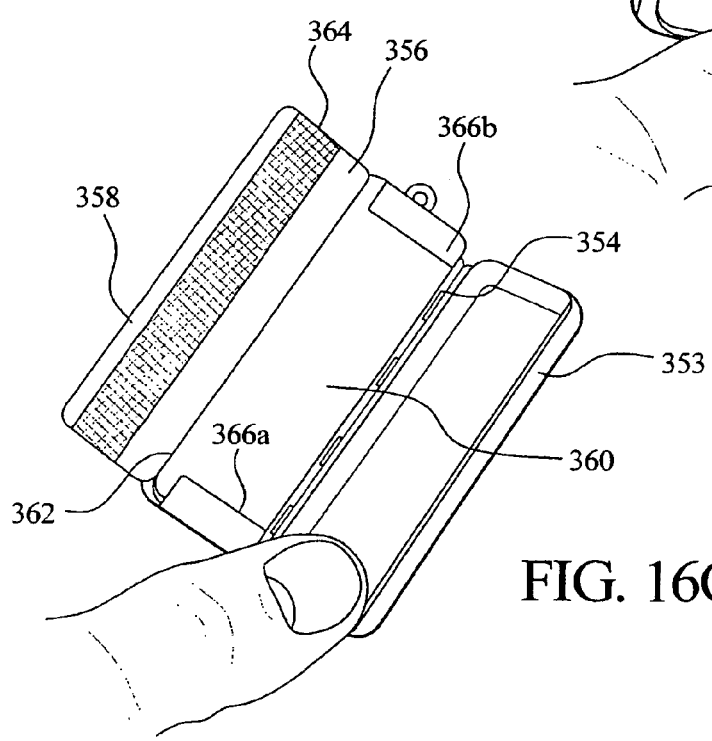

FIGS. 16A-16C illustrate an example of a foldable transaction card system 350 comprising a carrier 351, having a lid 353 and a base 355. Lid 353 and base 355 may be separated by a hinge 354 that may be tensioned so as to automatically close lid 353 upon base 355. Therefore, to open carrier 351, an individual may merely swing lid 353 from base 355 against the tension of hinge 354, thereby allowing a foldable transaction card 356 to be exposed.

Foldable transaction card 356 may have a first section 360 and a second section 358 that are interconnected via a hinge 362. Hinge 362 may be similar, if not identical, to hinge 312, as described above with reference to FIGS. 15A-15D.

Foldable transaction card 356 may be contained within carrier 351 by being disposed within tracks 366*a*, 366*b*. Tracks 266*a*, 366*b* may engage foldable transaction card 356 when foldable transaction card 356 is slid within tracks 366*a*, 366*b*. Moreover, tabs (not shown) may be disposed within tracks 366*a*, 366*b*, and may be similar, if not identical, to tabs 318*a*, 318*b* as described above with reference to FIG. 15D. Moreover, foldable transaction card 356 may have recesses (not shown) substantially as described above with reference to foldable transaction card 306.

In use, lid 353 may be swung from base 355 to expose transaction card 356 contained therein. Transaction card 356, having transaction card hinge 362 may be opened to expose a magnetic stripe 364 disposed on or within transaction card 356. Transaction card 356 (in an unfolded state) may be swiped or otherwise utilized at a point-of-sale device while remaining disposed within carrier 351. Transaction card 356 may be removed from carrier 351 to be utilized, such as being physically disposed within a point-of-sale device, such as an automated teller machine, or the like.

Figure 17:
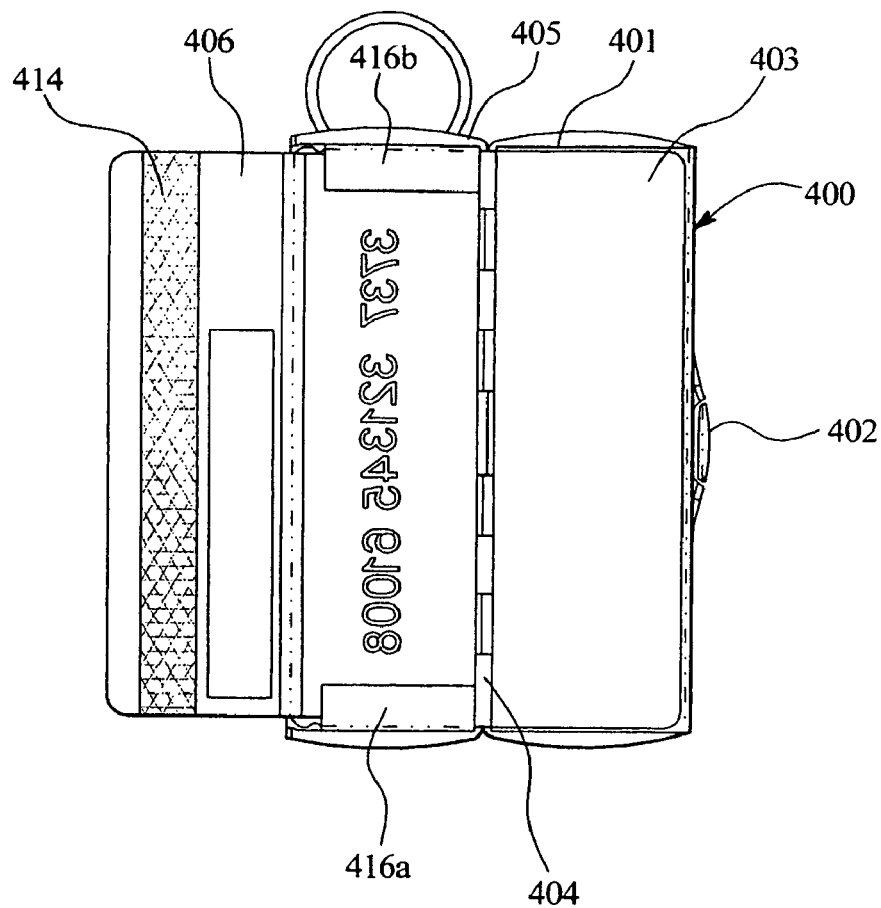
FIG. 17 illustrates an embodiment of a foldable transaction card system having an actuating means disposed on an edge of a case for opening the case and accessing the transaction card disposed therein.

FIG. 17 illustrates an embodiment of a foldable transaction card system 400 having a foldable carrier 401 having a lid 403 and a base 405 separated by a hinge 404. A foldable transaction card 406 may be disposed within tracks 416*a*, 416*b* so as to be removable from carrier 401 when carrier 401 is unfolded or opened. Carrier 401 further has an actuator 402 disposed on the edge of lid 403 for allowing carrier 401 to be opened when the actuator 402 is actuated. Specifically, lid 403 and base 405 may remain together when carrier 401 is folded by an engaging means, such as a clip or other like device. By actuating actuator 402, the engaging means may release, thereby allowing lid 403 to swing away from base 405. Hinge 404 may be spring-loaded, thereby allowing lid 403 to easily and automatically swing away from base 405. Transaction card 406 contained therein may be unfolded via a transaction card hinge 412, thereby exposing magnetic stripe 414. Transaction card 406 may then be utilized. Transaction card 406 may be removed from carrier 401 and utilized.

Transaction card 406 may be removably disposed within carrier 401 in a similar manner as described above with reference to FIGS. 15A-15D and FIGS. 16A-16C. Specifically, transaction card 406 may be contained within carrier 401 by being disposed within tracks 416*a*, 416*b*. Tracks 416*a*, 416*b* may engage transaction card 406 when transaction card 406 is slid within tracks 416*a*, 416*b*. Moreover, tabs (not shown) may be disposed within tracks 416*a*, 416*b*, and may be similar, if not identical, to tabs 318*a*, 318*b* as described above with reference to FIGS. 15A-15D. Moreover, transaction card 406 may have recesses (not shown) substantially as described above with reference to transaction card 306 described above in FIG. 15D.

Figure 18A:
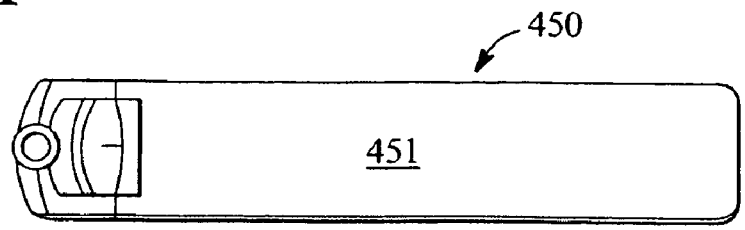
FIGS. 18A to 18C illustrate an embodiment of a foldable transaction card system for a tri-foldable transaction card.
Figure 18B:
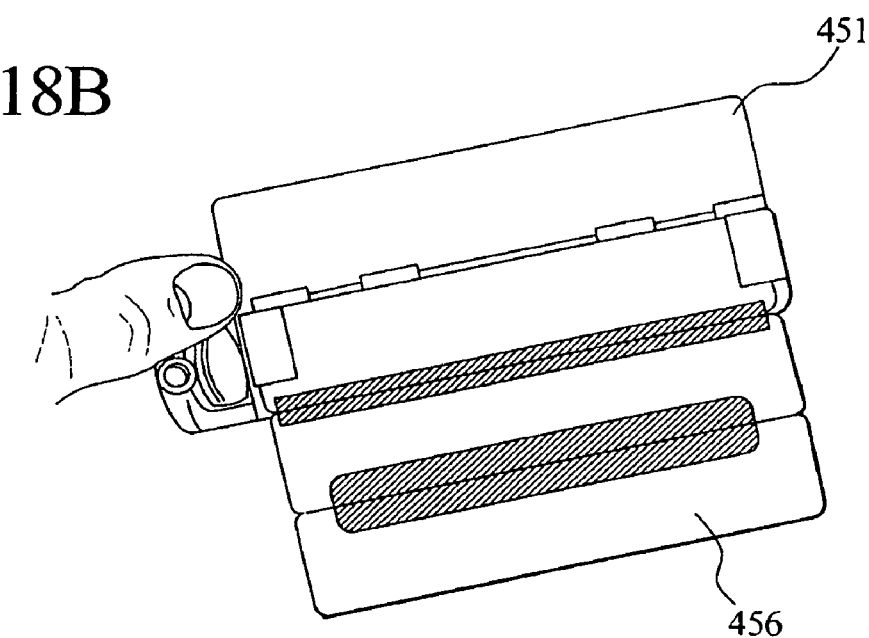
Figure 18C:
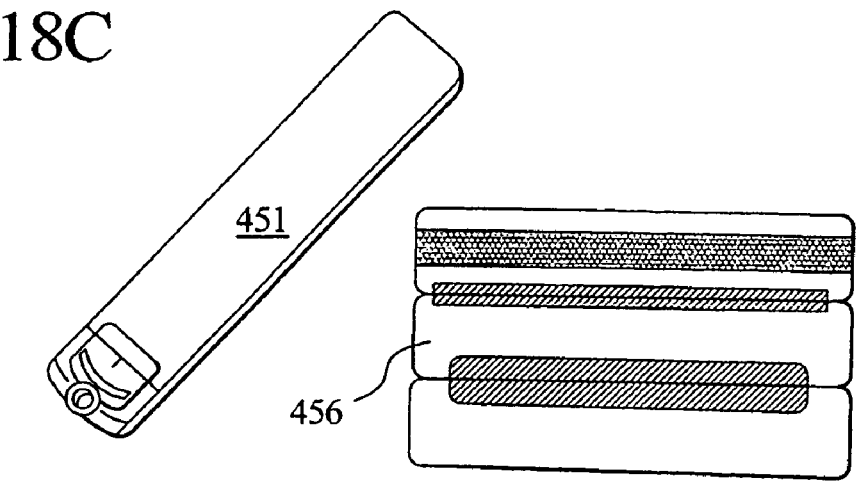

FIGS. 18A-18C illustrate an embodiment of a foldable transaction card system 450 substantially similar to transaction card system 300 illustrated above with respect to FIGS. 15A-15D, including an actuator 452 substantially similar to actuator 302 described above. However, system 450 may comprise a carrier 451 that may be smaller in width than carrier 301. A transaction card 456 disposed within carrier 451 may be tri-folded, thereby taking up less width space and allowing a smaller carrier 451 to be utilized. As with transaction card 306, described above, transaction card 456 may be usable within carrier 401, as illustrated in FIG. 18B, or may be completely removed from carrier 401, as illustrated in FIG. 18C.

Figure 19:
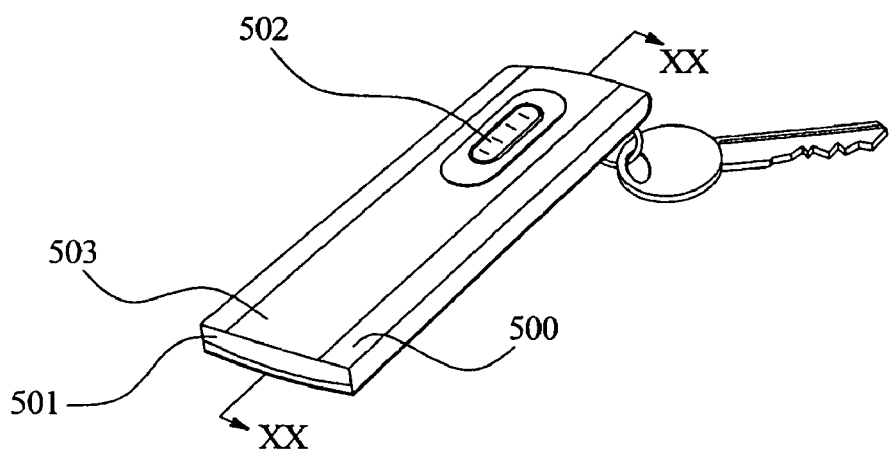
FIG. 19 illustrates a further embodiment of a foldable transaction card system having an actuating means disposed on a surface of a case for opening the case and accessing the transaction card disposed therein.

FIG. 19 illustrates an embodiment of a foldable transaction card system 500 having a carrier 501 with a transaction card contained therein (not shown), which is substantially similar to the transaction card system 400, described above with reference to FIG. 17. However, foldable transaction card system 500 may include an actuator 502 disposed on a surface of a lid 503 of carrier 501, having the foldable transaction card (not shown) contained therein. Actuator 502 may be disposed such that actuator 502 does not protrude greatly or at all from the surface of lid 503. By actuating the actuator 502, carrier 501 may be opened to access the transaction card (not shown) that may be contained therein.

Figure 20A:
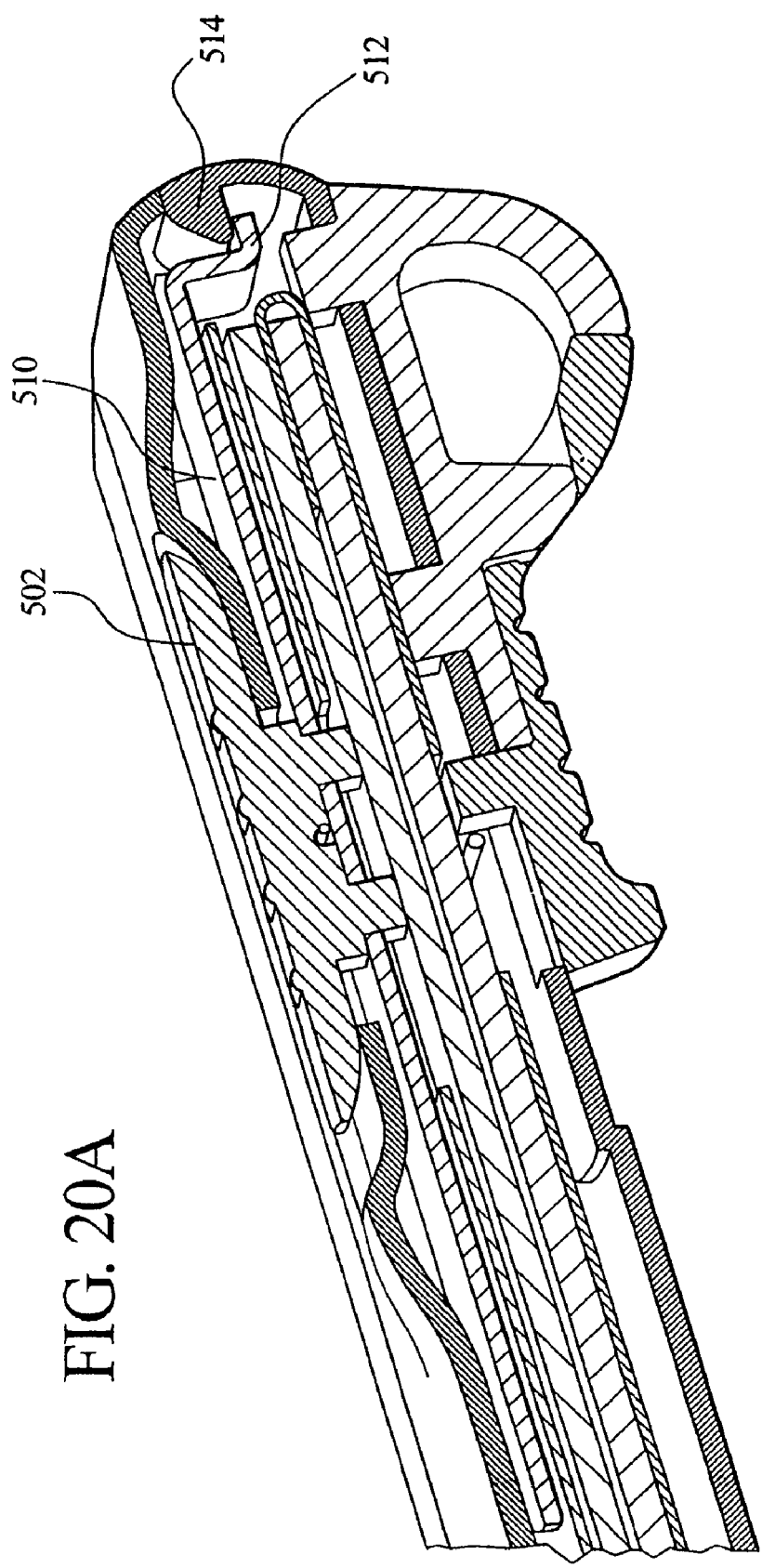
FIGS. 20A to 20B illustrate cross-sectional views of the foldable transaction card system in an embodiment.
Figure 20B:
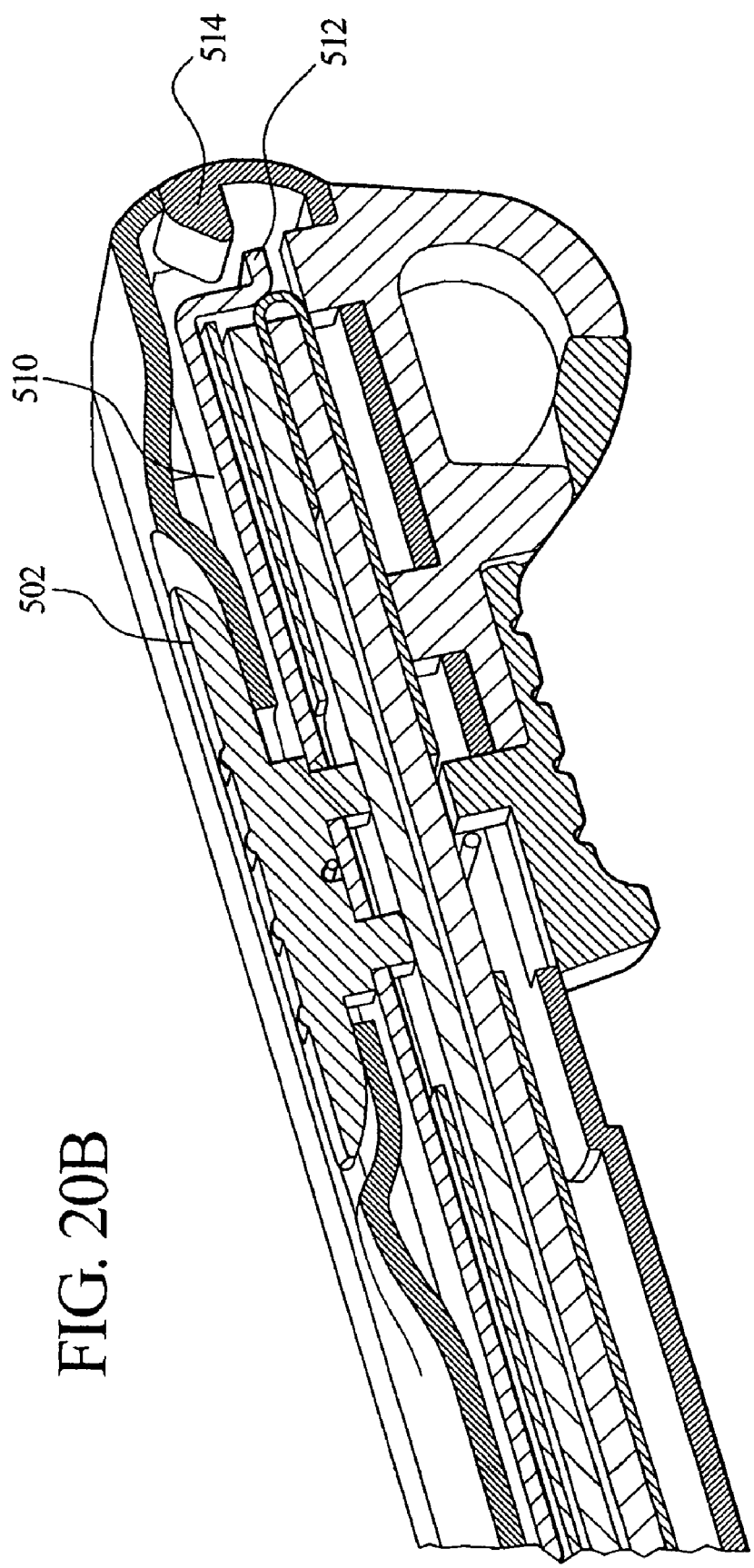

FIGS. 20A-20B illustrate cross-sectional views of carrier 501 illustrating actuator 502 that allows carrier 501 to open when actuator 502 is actuated. Specifically, FIG. 20A illustrates actuator 502 when the carrier 501 is closed. Actuator 502 is interconnectedly engaged with an arm 510 having an end 512 that may be configured to engage a tab 514. End 512 of arm 510 engages tab 514 to keep carrier 501 from opening. When actuator 502 is actuated, by depressing actuator 502 or otherwise moving actuator 502, end 512 of arm 510 may disengage from tab 514, thereby allowing carrier 501 to open, exposing the foldable transaction card contained therein. For example, as illustrated in FIG. 20B, actuator 510 may be moved with a thumb or finger, thereby moving arm 510 and disengaging end 512 of arm 510 from tab 514.

Figure 21A:
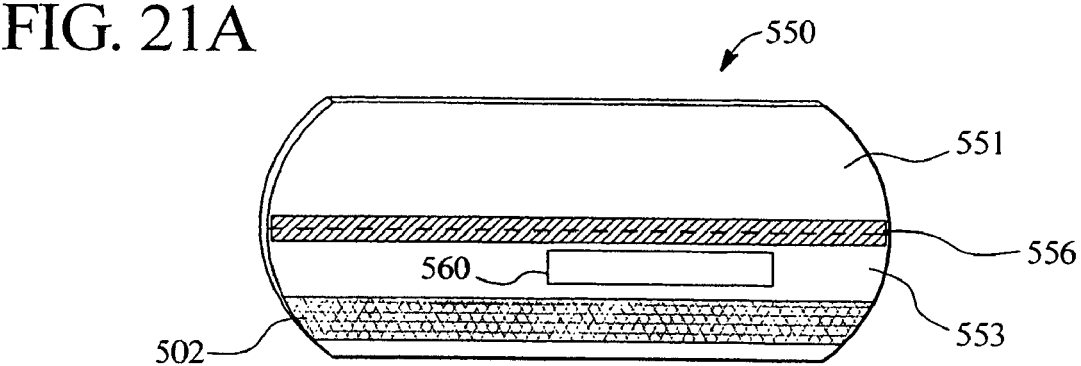
FIGS. 21A to 21C illustrate an embodiment of a foldable transaction card.
Figure 21B:
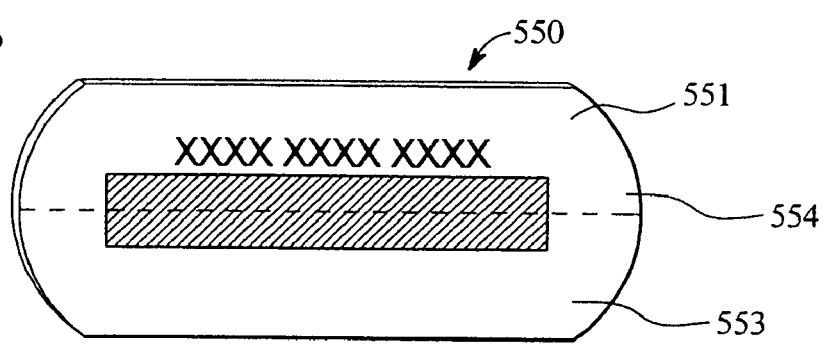

FIGS. 21A-21B illustrates an embodiment of a foldable transaction card 550 having a shape different from that of a traditional transaction card. Foldable transaction card 550 includes features common to traditional transaction cards, such as a signature panel 560 and a magnetic stripe 562. Of course, other features common to transaction cards may also be included, such as holographic images useful as security indicators, embedded microchips, or other like features.

Figure 21C:
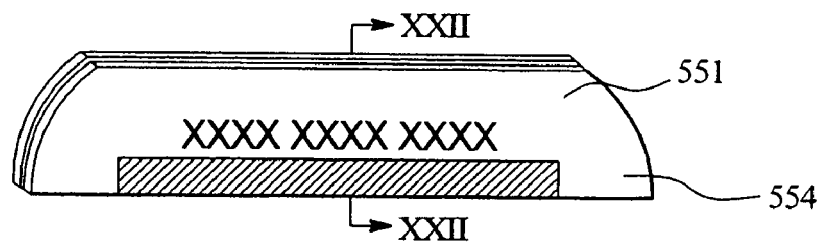

Specifically, transaction card 550 may comprise two halves 551, 553 that may be attached together via a hinge material 554 and a hinge backing material 556. The hinge material 554 may comprise an elastomeric material, such as a nitrile or neoprene elastomeric material, that may be disposed between halves 551, 553. Of course, any other hinge material is contemplated that may attach halves 551, 553 together, thereby allowing transaction card 550 to fold. In addition, hinge material 554 may be disposed within transaction card 550 in one or a plurality of internal layers. Hinge material 554 may, therefore, stretch when transaction card 550 is folded but retain its shape when transaction card 550 is unfolded. Transaction card 550 is folded such that the signature panel 560 and the magnetic stripe 562 are disposed within the folded transaction card, thereby protecting signature panel 560 and, especially, magnetic stripe 562. Hinge backing material 556 may be provided on an opposite side of transaction card 550 to provide reinforcement so that halves 551, 553 do not separate. Typically, hinge backing material 556 may be polypropylene, or other thermoplastic material that reinforces the hinge created between halves 551, 553 of foldable transaction card 550. Of course, other materials are contemplated that may reinforce the hinge created between halves 551, 553. FIG. 21C illustrates foldable transaction card 550 in a folded state.

Transaction card 550 may be any size. Transaction card 550 may have one or more dimensions smaller than traditional transaction cards. Specifically, a traditional transaction card may be about 3⅜ inches long and about 2¼ inches wide. Transaction card 550 may have a greatest length (measured from the middle of the foldable transaction card 550) that is less than 3⅜ inches. Particular embodiments illustrating non-traditionally-sized transaction cards are described herein with reference to FIGS. 24-28, as described below.

Figure 22:
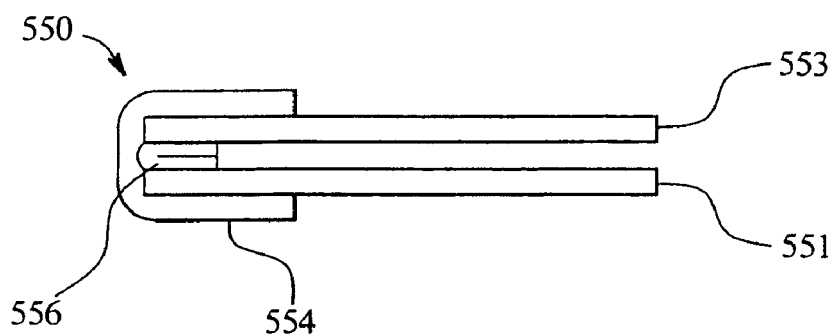
FIG. 22 illustrates a cross-sectional view of the foldable transaction card in a folded state in an embodiment.

FIG. 22 illustrates a cross-sectional view of transaction card 550 folded, thereby illustrating hinge material 554 and hinge backing material 556 utilized to create the hinge in transaction card 550. Specifically, hinge material 554 is stretched when transaction card 550 is folded. Because hinge material 554 may be made from an elastomeric material, hinge material 554 may stretch when transaction card 550 is folded and then may retain its original shape when transaction card 550 is unfolded.

Figure 23:
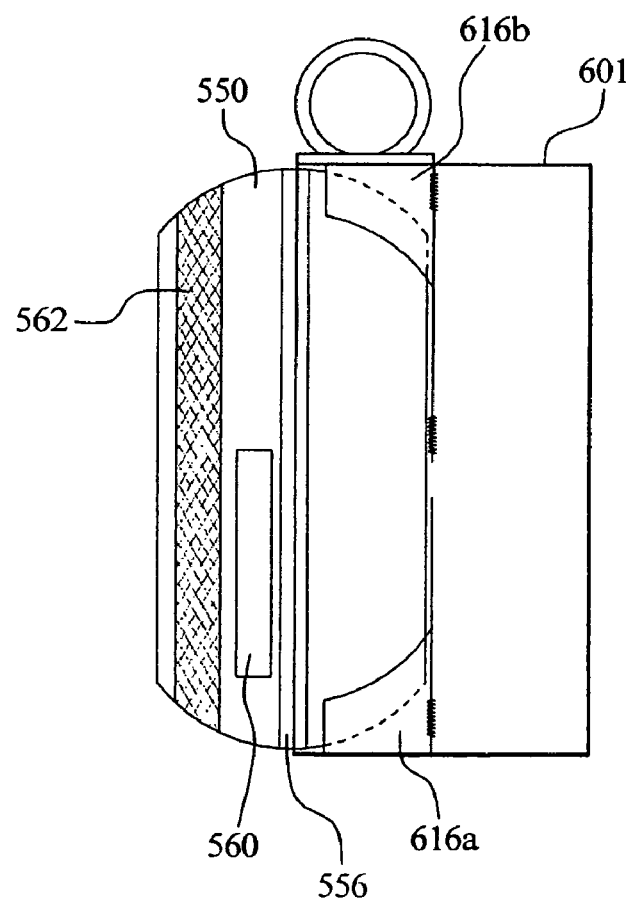
FIG. 23 illustrates a still further embodiment of a foldable transaction card system.

FIG. 23 illustrates a foldable transaction card system 600 incorporating the foldable transaction card 550, described above with respect to FIGS. 21A-21C and FIG. 22. Transaction card 550 may include signature panel 560 and magnetic stripe 562. Moreover transaction card system 600 may include a carrier 601 that is substantially similar to transaction card system 400, described above with reference to FIG. 17. However, carrier 601 may include tracks 616a, 616b that are generally shaped like the edges of transaction card 550. Specifically, since the edges of foldable transaction card 550 may have curved edges, rather than straight edges, which would be typical for a traditional transaction card, tracks 616a, 616b may also be curved to follow the curve of transaction card 550. Tracks 616a, 616b may be any other shape to hold transaction card 550 therein. In addition, since transaction card 550 may have at least one dimension that is smaller than traditional transaction cards, carrier 601 may be smaller than if a traditionally-sized transaction card was utilized.

Transaction cards of the present embodiment described herein may have lengths and widths that are smaller or larger than traditional transaction cards. More specifically, a traditional transaction card may have a length of about 3⅜ inches and a width of about 2¼ inches. Therefore, a transaction card having a length, for example, of less than 3⅜ inches may allow for a smaller foldable transaction card system when the transaction card has a fold therein and is disposed within a carrier, as described above. FIGS. 24-28 illustrate various embodiments of transaction cards that may be utilized herein having dimensions, i.e., lengths and widths, that are non-traditional.

Figure 24:
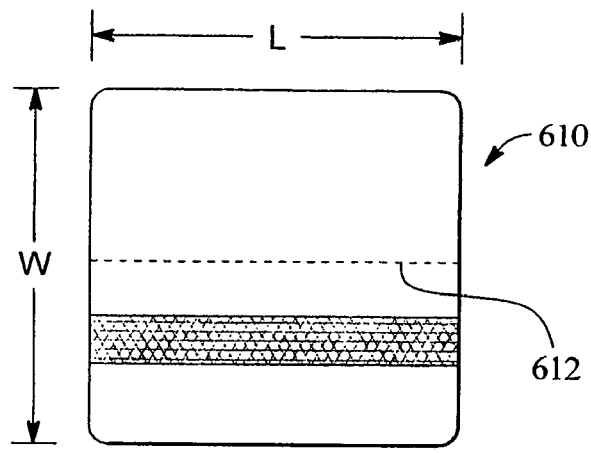
FIGS. 24-28 illustrate still further embodiments of non-traditionally-sized and shaped transaction cards that may be utilized in embodiments described herein.

Transaction card 610 shown in FIG. 24 has a width (W) of less than approximately 1 inch and a length (L) of also less than approximately 1 inch. For example, as shown in FIG. 24, transaction card 610 is generally square and the width W may be approximately ¾ inch and the length L may also be approximately ¾ inch. A fold line 612 may be disposed within transaction card 610, as described above.

Figure 25A:
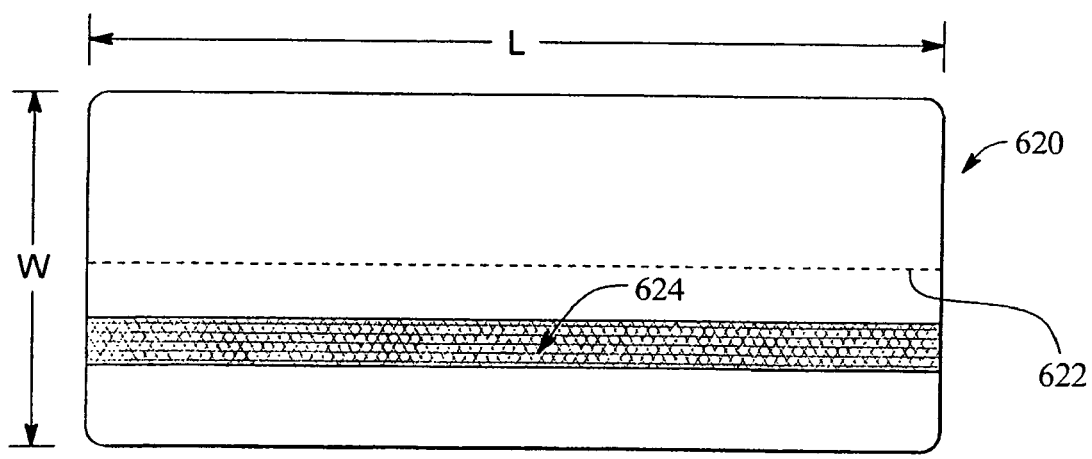
Figure 25B:
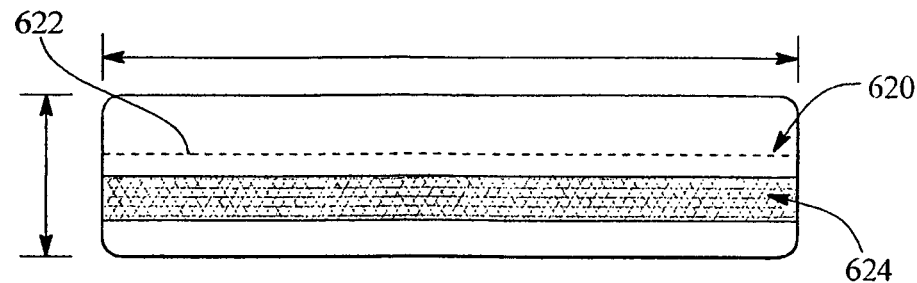

FIGS. 25A and 25B illustrate embodiments of a transaction card 620 having a magnetic stripe 624 that is parallel to a side 626 of transaction card 620. Transaction card 620 may be made from the same or similar materials as transaction card 610 described above with reference to FIG. 1. In addition, transaction card 620 may have a fold line 622 disposed within transaction card 620, as described above.

Transaction card 620 shown has a width (W) and a length (L). In this particular embodiment, transaction card 620 has a length L of greater than 3 inches, and may have a length greater than approximately 3⅜ inches. For example, as shown in FIG. 25A, transaction card 620 may have a width W of approximately 2 inches and a length L of approximately 4 inches. As shown in FIG. 25B, width W may be approximately 1 inch and the length L may be approximately 3⅞ inches. Therefore, transaction card 620 may be longer than a standard transaction card, but narrower than a standard transaction card. This may allow transaction card 620 to be kept or stored in locations where the widthwise dimension limits the storage capability of transaction card 620.

Figure 26A:
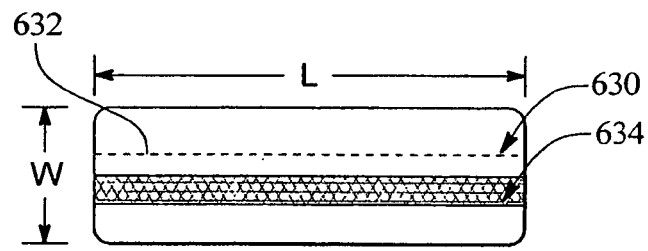
Figure 26B:
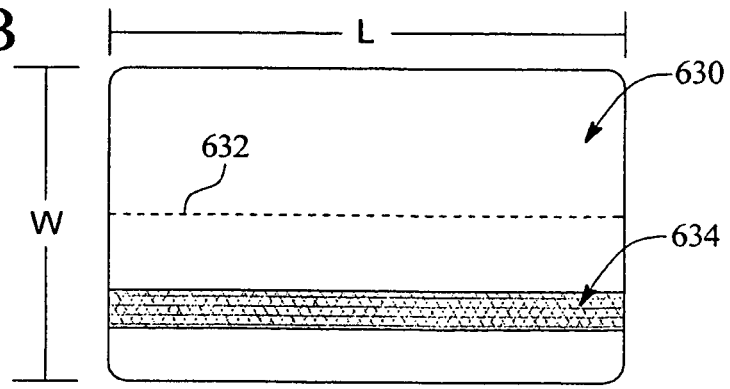

FIGS. 26A and 26B illustrate further embodiments of a transaction card 630 having a magnetic stripe 634 that is parallel to a side 636 of transaction card 630. Transaction card 630 may be comprised of the same materials as described above with reference to transaction card 610. In addition, transaction card 630 may have a fold line 632 disposed within transaction card 630, as described above.

Transaction card 630 shown has a width (W) and a length (L). In the embodiment described herein with reference to FIGS. 26A and 26B, transaction card 630 has a length L of between approximately 1 inch and approximately 3 inches and a width W of less than approximately 1 inch or greater than approximately 1⅞ inches. For example, as shown in FIG. 26A, transaction card 630 may have a width W of approximately ¾ inch and a length L of approximately 2¼ inches. As shown in FIG. 26B, width W may be approximately 2⅛ inches and length L may be approximately 3 inches.

Figure 27:
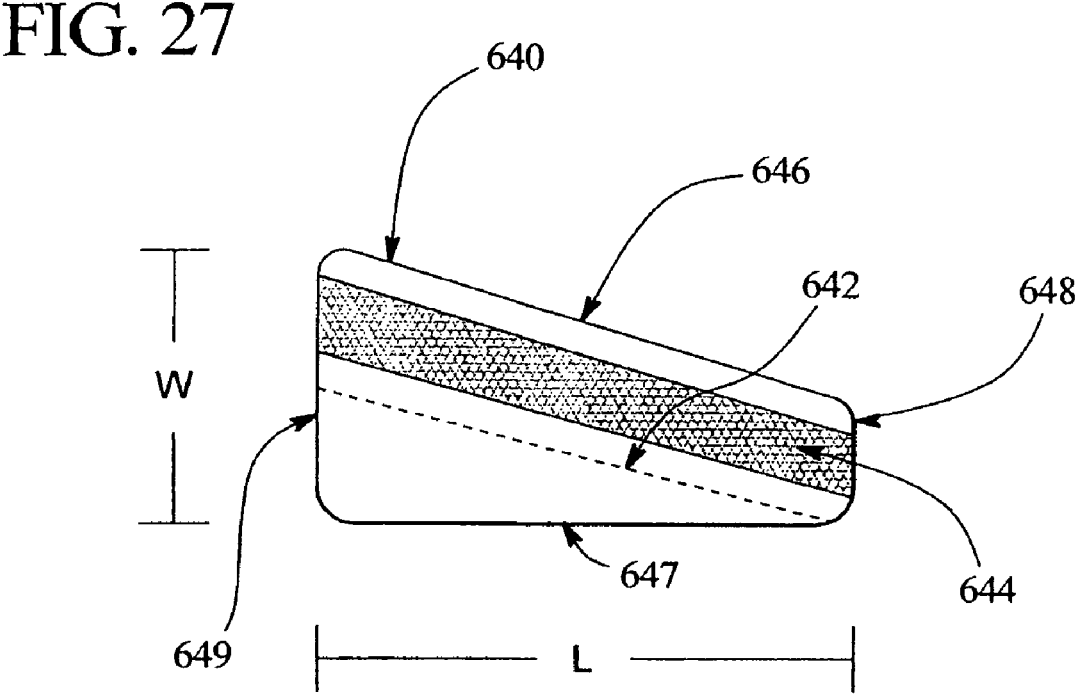

FIG. 27 illustrates an embodiment of a transaction card 640 having a magnetic stripe 644 that is parallel to a side 646 of the transaction card 640. The magnetic stripe may be parallel to one of the other sides 647, 648 or 649. Transaction card 640 may be comprised of the same or similar materials as that of transaction card 610. In this particular embodiment, transaction card 640 may have at least one set of opposing sides 646 and 647, or 648 and 649 that is not parallel. In addition, transaction card 640 may have a fold line 642 disposed within transaction card 640, as described above.

Transaction card 640 shown has a width (W) and a length (L). Transaction card 640 has a length L of between approximately 1 inch and approximately 1⅞ inches or a length L of greater than approximately 3 inches, and may have a length greater than approximately 3⅜ inches. In addition, width W is less than approximately 1 inch or greater than approximately 1⅞ inches. For example, as shown in FIG. 27, transaction card 640 may have a width W of approximately ¾ inch and a length L of approximately 1½ inches. Width W may be approximately 2 inches and length L may be approximately 3½ inches.

Figure 28:
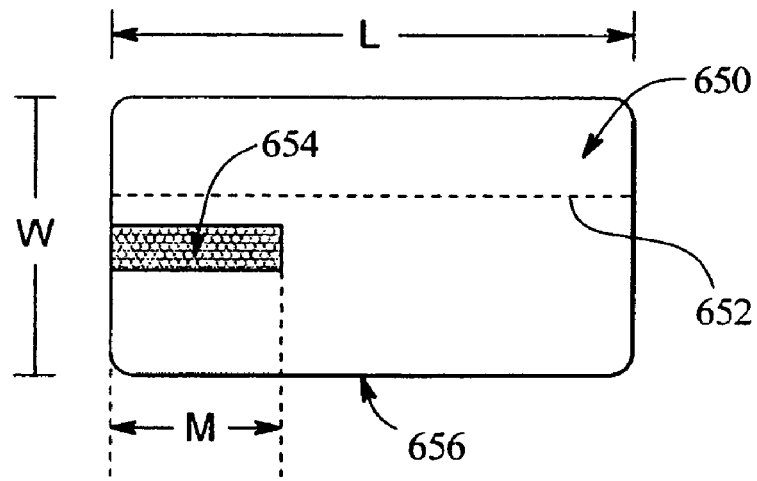

FIG. 28 illustrates an embodiment of a transaction card 650 having a magnetic stripe 654 that is parallel to a side 656 of transaction card 650. Transaction card 650 may comprise the same or similar material as that described above with reference to transaction card 610. In addition, transaction card 650 may have a fold line 652 disposed within transaction card 650, as described above.

Transaction card 650 may have any length L or width W, so long as transaction card 650 has a magnetic stripe 652 of length M, which is less than approximately 1 inch. Transaction card 650 may have any length L or width W, so long as length M of the magnetic stripe 654 is greater than approximately 3 inches long and may have length greater than approximately 3⅜ inches long.

As noted above, each embodiment of a non-traditionally sized transaction card (i.e., having dimensions larger or smaller than traditionally-sized transaction cards) may have a fold line disposed therein and a hinge material that allows the transaction card to fold and unfold. The foldable non-traditionally sized transaction card may be incorporated into a foldable transaction card system, whereby the foldable transaction card has a carrier for holding and/or storing the foldable transaction card. The non-traditionally sized foldable transaction card allows for the use of carriers that are smaller in a certain dimension, such as a length and/or width, thereby providing transaction card systems that may be smaller, and more usable, especially when incorporated onto a keychain or other like connecting means. Other sizes and shapes of transaction cards may be utilized in the present invention to arrive at a foldable transaction card system that is compact and convenient.

In an embodiment, a foldable transaction card system may be combined with a money clip. For example, the embodiments described herein of a foldable transaction card and carrier may include a money clip on a surface of the carrier for holding and/or storing currency, or other like material. Moreover, the foldable transaction card systems may further be combined with a mobile telephone, such as a cellular telephone, or other personal communication device, such that the foldable transaction card may be removably attached to a carrier that may be interconnected with the mobile telephone. Of course, foldable transaction card systems may be incorporated into other items as well, such as personal digital assistants ("PDAs") or other like devices.

Referring again to FIG. 15D, transaction card 306 is illustrated having a transaction card hinge 312. Transaction card hinge 312 may be disposed over a line of weakness or a slit disposed in the one or more layers of transaction card 306. First section 310 and second section 308 of transaction card 306 may be separated from each other, but for a hinge material 321, such as a polymeric material, a fabric, or some other equivalent reinforcing material, that may bridge first section 310 and second section 308. Moreover, hinge material 321 may be disposed over the line of weakness or slit between first section 310 and second section 308. Hinge material 321 may be a thermoplastic polymeric sheet or film, such as, for example, polypropylene or other like thermoplastic polymeric material, that may be adhered to both first section 310 and second section 308 to allow first section 310 and second section 308 to move relative to each other, thereby allowing transaction card 306 to fold. Hinge material 321 may be an elastomeric material, such as nitrile or neoprene or other like material, for example.

Further, disposed on an opposite side of transaction card 306 may be a further hinge material 322, as illustrated in FIG. 15D, that may further allow first section 310 and second section 308 to be moveable relative to each other, thereby allowing transaction card 306 to be foldable. Further hinge material 322 may be any material, such as a polymeric material, a fabric, or other like material, similar to the hinge material 321, described above. Further hinge material 322 may be a softer and more elastic material than the hinge material 321 so as to allow transaction card 306 to be folded to protect a magnetic stripe 314 that may be disposed on the same side of transaction card 306 as hinge material 321. Further hinge material 322 may be an elastomeric material, such as nitrile or neoprene, that easily stretches when transaction card 306 is folded, and yet retains its shape when transaction card 306 is unfolded.

The hinge described above with respect to FIG. 15D generally allows foldable transaction card 306 to be folded in one direction, so as to fold over the magnetic stripe, signature panel, or other like feature, thereby protecting the magnetic stripe, the signature panel, or other like feature. However, a foldable transaction card is contemplated and described herein below that may fold in both directions or either direction so as to cover and protect either a front surface of a transaction card or a back surface of a transaction card. In addition, a foldable transaction card that folds in both directions may be useful so that a user of the transaction card does not accidentally fold the transaction card in the wrong direction, thereby damaging the foldable transaction card.

Figure 29:
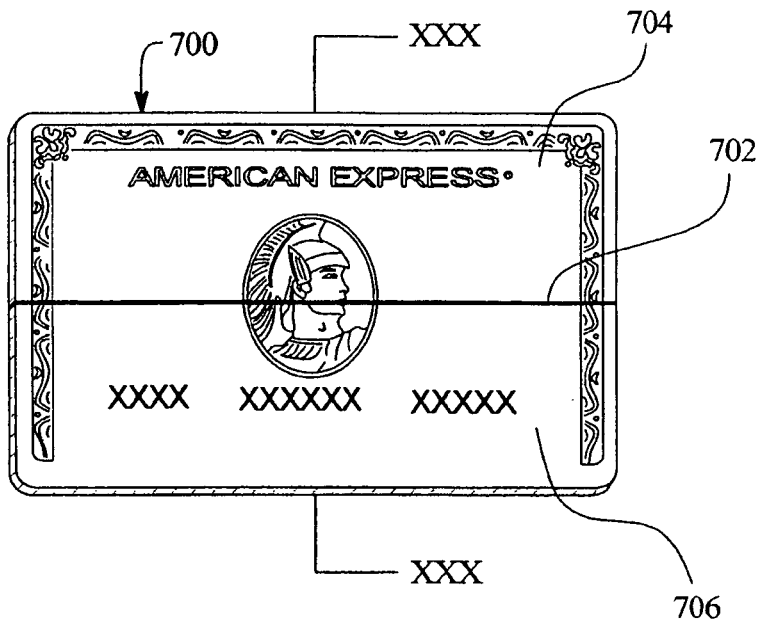
FIG. 29 illustrates a perspective view of a foldable transaction card in an embodiment of the present invention.

Now referring to FIG. 29, a foldable transaction card 700 is illustrated having a fold line 702 disposed between a first section 704 and a second section 706. Fold line 702 allows transaction card 700 to fold in either direction, such that, when folded, either the front surface or the back surface of transaction card 700 may be covered.

Figure 30:
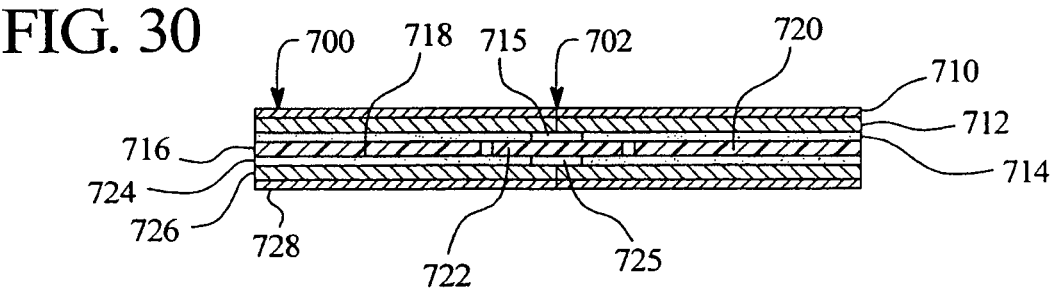
FIG. 30 illustrates a cross-sectional view of a foldable transaction card along line XXX-XXX in an embodiment of the present invention.

FIG. 30 illustrates a cross-sectional view of transaction card 700 along line XXX-XXX. As illustrated, transaction card 700 comprises a plurality of layers and has fold line 702 disposed therein, which is described in more detail below.

Transaction card 700 may comprise a top layer 710 comprising a polymeric material useful as a protective topcoat layer. Top layer 710 may be transparent, and may be utilized to protect the layers disposed beneath top layer 710, as described below. Any thermoplastic polymeric material may be utilized as top layer 710. When a thermoplastic polymeric material is transparent polyvinyl chloride, so as to allow a graphic layer 712, described below, to be viewable. The thickness of top layer 710 is about 1.8 mils (about 46 microns), although any other thickness is contemplated.

Disposed beneath top layer 710 is a graphic layer 712 comprising a printed thermoplastic polymeric material, such as polyvinyl chloride although any thermoplastic polymeric material may be utilized as apparent to one having ordinary skill in the art. The thickness of graphic layer 712 is about 6 or 7 mils (about 15 to 18 microns), although any other thickness is contemplated.

Disposed beneath graphic layer 712 may be an adhesive layer 714 for bonding graphic layer 712 to a core layer 716 comprising polymeric spacers 718, 720 and an elastomeric material 722, described below: Adhesive layer 714 may be any adhesive apparent to one having ordinary skill in the art for bonding the layers of transaction card 700 together. Adhesive layer 714 may comprise a tripartite construction of adhesive and polyester. Specifically, adhesive layer 714 may comprise a first sublayer comprising about 1 mil (about 25 microns) adhesive, a second sublayer comprising about 1 mil (about 25 microns) polyester, and a third sublayer comprising about 1 mil (about 25 microns) adhesive. Adhesive layer 714 may or may not be disposed across entire transaction card 700, which may have a gap 715, thereby providing hinge material 722 (described below) freedom to stretch, thereby allowing transaction card 700 to easily fold. Adhesive layer 714 may have a release material, such as a silicone material disposed in the center of adhesive layer 714 facing core layer 716, described below, thereby allowing hinge material 722 freedom to stretch. Adhesive layer 714 may be disposed across entire transaction card 700 without gap 715 or the release material. Adhesive layer 714 may be about 3 mils (about 76 microns) in total thickness, although any other thickness is contemplated.

Disposed beneath adhesive layer 714 is a core layer 716. Core layer 716 may comprise a first spacer 718 and a second spacer 720 disposed on opposite sides of hinge material 722, which is generally disposed in the center of core layer 716 and disposed so as to straddle fold line 702. First spacer 718 and second spacer 720 may comprise polyvinyl chloride, although any similar thermoplastic polymer may be utilized. First spacer 718 and second spacer 720 are about 10 mils (about 254 microns) thick. Disposed between first spacer 718 and second spacer 720 is hinge material 722. Hinge material 722 may be an elastomeric material, such as nitrile or neoprene, for example, and may be about 15 mils (about 380 microns) thick, and may be disposed so as not to fill the entire space between first spacer 718 and second spacer 720. This allows hinge material 722 to be stretched and/or compressed to fill the entire space when the layers of transaction card 700 are laminated together, which may also thin hinge material 722 to about 10 mils (about 254 microns). The lamination pressure may stretch hinge material 722 to fill the space between first spacer 718 and second spacer 720, thereby providing tension in hinge material 722 to keep transaction card 700 flat and in an unfolded state when at rest. Folding transaction card 700 stretches hinge material 722, which may act as a spring allowing transaction card 700 to "snap" back to its flat configuration.

Hinge material 722 may be a strip of elastomeric material, as described above. Hinge material 722 may comprise a plurality of strips that are disposed side-by-side with spacing therebetween, to allow reinforcing thermoplastic, such as polyvinyl chloride, to be disposed between the strips when the layers of transaction card 700 are laminated together, thereby adding strength and/or rigidity to transaction cards 700 Hinge material 722 may comprise holes for allowing reinforcing thermoplastic, such as PVC, to be disposed within the holes when the layers of transaction card 700 are laminated together. Hinge material 722 may be disposed across entire transaction card 700, thereby precluding the use of or need for spacers 718, 720.

Disposed beneath core layer 716 may be a second adhesive layer 724 that may be substantially similar to, if not identical to, adhesive layer 714 described above. More specifically, adhesive layer 724 may comprise a tripartite construction of a first sublayer of adhesive that is generally about 1 mil (about 25 microns) thick, a second sublayer of polyester that is generally about 1 mil (about 25 microns) thick, and a third sublayer of adhesive that is generally about 1 mil (about 25 microns) thick. Adhesive layer 724 may or may not be disposed across entire transaction card 700, and may have a gap 725, thereby providing hinge material 722 freedom to stretch, thereby allowing transaction card 700 to easily fold. Adhesive layer 724 may comprise a release material disposed on a surface facing core layer 716 and further disposed in the center of adhesive layer 724 thereby allowing hinge material 722 freedom to stretch.

Disposed beneath second adhesive layer 724 is a second graphic layer 726. Second graphic layer 726 may comprise a printed layer of polyvinyl chloride, although any other polymeric material may be utilized as apparent to one having ordinary skill in the art. Disposed beneath second graphic layer 726 may be a bottom layer 728 comprising a protective polymeric material such as transparent polyvinyl chloride, so as to allow the graphics printed on second graphic layer 726 to be viewable.

Not shown are other features common to transaction cards, such as a signature panel, a magnetic stripe, holographic features, photographs, microchips and the like, which may be incorporated on transaction card 700 or within the layers of transaction card 700.

Figure 31:
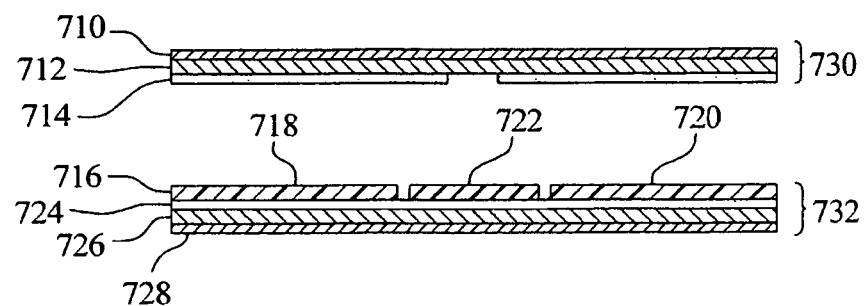
FIG. 31 illustrates a cross-sectional view of first and second subassemblies prior to laminating to make the foldable transaction card.

Now referring to FIG. 31, a first subassembly 730 and a second subassembly 732 of transaction card 700 are illustrated. In general, transaction card 700 may be constructed by laminating first subassembly 730 and second subassembly 732 together. Further, the subassemblies may be constructed on large sheets prior to punching out individual cards. The subassemblies may be laminated together to form a laminated assembly (not shown) prior to punching out, cutting or otherwise removing individual cards.

First subassembly 730 may comprise top layer 710, graphic layer 712 and adhesive layer 714. Second subassembly 732 may comprise core layer 716 comprising first spacer 718, second spacer 720 and hinge material 722, second adhesive layer 724, second graphic layer 726 and bottom layer 728. However, first and second subassemblies 730, 732 may comprise other layers not detailed herein, which may be utilized to provide strength, rigidity and other like properties to a transaction card made therefrom.

First subassembly 730 and second subassembly 732 may be manufactured separately in large sheets and laminated together to form an assembly having all layers shown in the cross-sectional view of FIG. 30. Each individual transaction card 700 may be punched out, cut or otherwise removed from the assembly. The subassemblies may be made without top layer 710 and bottom layer 728. After the subassemblies are laminated together, top layer 710 and bottom layer 728 may be laminated thereto. In addition, prior to punching out, cutting or otherwise removing individual cards, the laminated assembly may be slit or cut on opposite sides to form the fold line, such that all layers are cut, except for hinge material 722, which acts like a hinge disposed in the center of transaction card 700. This allows transaction card 700 to be folded in either direction, i.e. so as to fold over the front surface or the back surface of transaction card 700.

Each subassembly 730, 732 may be slit or cut prior to laminating the subassemblies together to form the assembly. This allows each subassembly 730, 732 to be slit or cut from the inside surface of each subassembly 730, 732, thereby allowing any jagged edge from the slitting of each subassembly 730, 732 to be disposed on an outer surface of each subassembly 730, 732, thereby minimizing contact between hinge material 722 and any jagged edges disposed on each subassembly 730, 732, which may be caused by cutting or slitting each subassembly 730, 732. This may increase the life of the transaction card 700 since wear of hinge material 722 is minimized.

Figure 32:
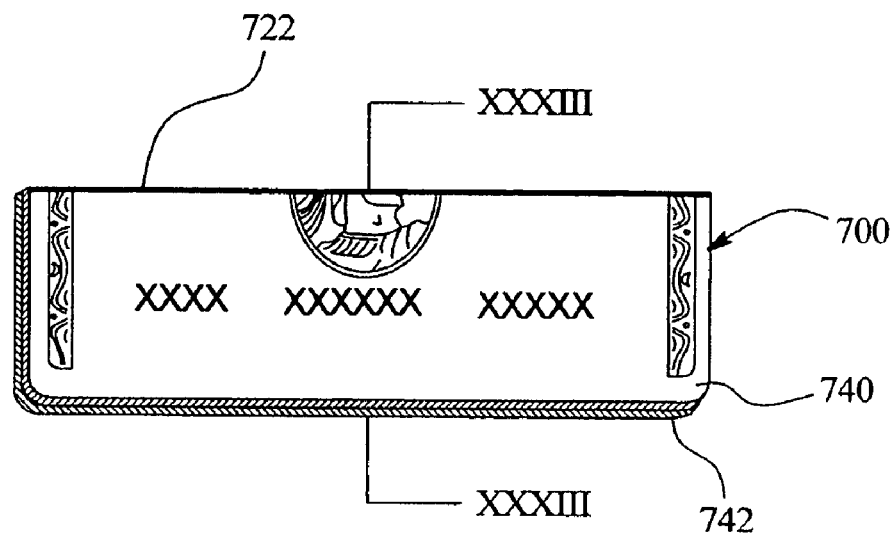
FIG. 32 illustrates a perspective view of a folded transaction card.
Figure 33:
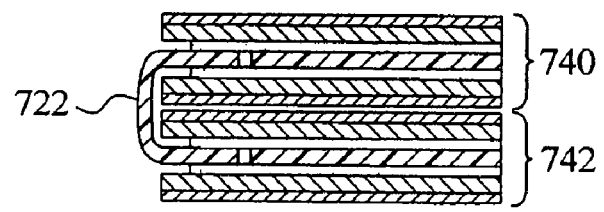
FIG. 33 illustrates a cross-sectional view of the folded transaction card along line XXXIII-XXXIII.

FIG. 32 illustrates transaction card 700 in a folded configuration having a first section 740 and a second section 742 disposed adjacently. Hinge material 722 may be utilized to allow first section 740 and second section 742 to fold relative to each other. FIG. 33 illustrates a cross-sectional view of transaction card 700 in a folded state, showing first section 740 and second section 742 adjacent each other, and connected by hinge material 722, which may be stretched and tensioned when first section 740 and second section 742 are folded.

Figure 34:
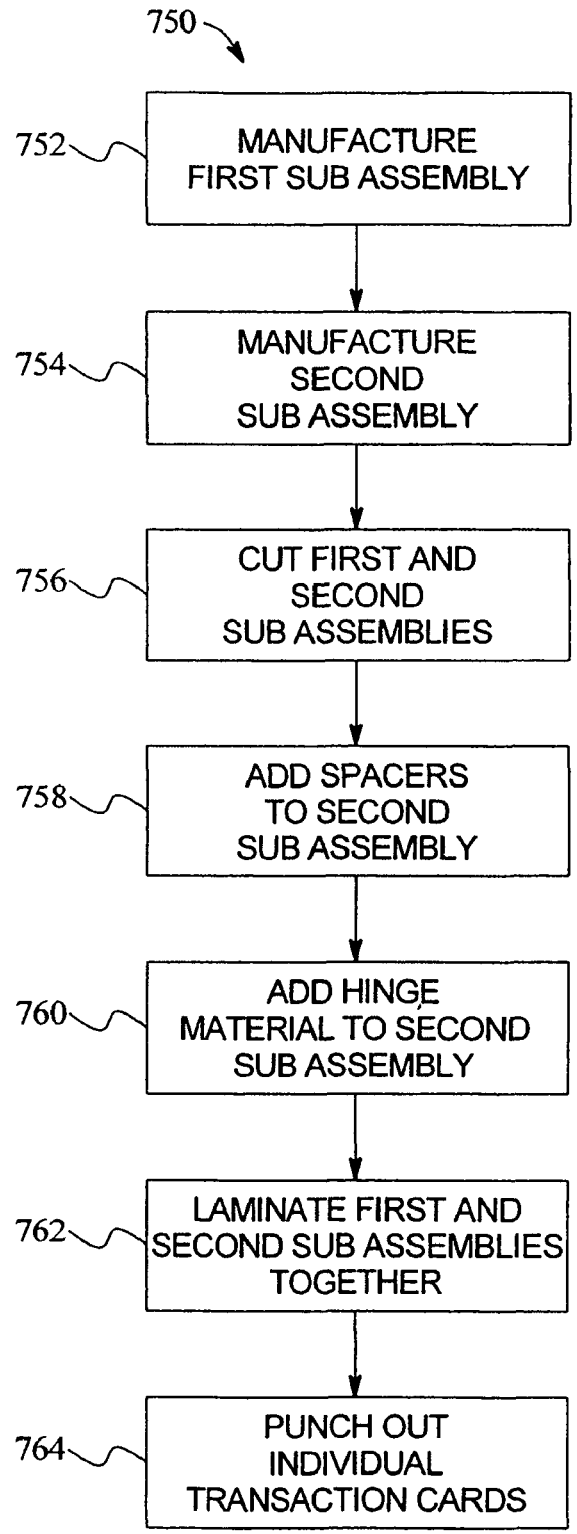
FIG. 34 illustrates a flow chart showing a method of making the foldable transaction card in an embodiment of the present invention.

FIG. 34 illustrates a method of making the foldable transaction cards described herein in a flowchart 750. In a first step 752, first subassembly 730 may be manufactured by laminating adhesive layer 714, graphic layer 712 and top layer 710 together in a first sheet. In a second step 754, second subassembly 732 may be manufactured by laminating second adhesive layer 724, second graphic layer 726 and bottom layer 728 together in a second sheet. In step 756, a cutter may cut or slit first and second subassemblies 730, 732 to form fold line 702. In step 758, first spacer 718 and second spacer 720 may be added to second subassembly 732. First spacer 718 and second spacer 720 may be tacked or otherwise adhered to second subassembly 732 so as to be unmovable until subassemblies 730, 732 are laminated together.

Hinge material 722 may then be added in step 760 to the space between first spacer 718 and second spacer 720 so as to straddle the fold line that has been cut or slit into second subassembly 732. In step 762, first subassembly 730 and second subassembly 732 may be laminated together with heat and pressure to fuse first subassembly 730 to second subassembly 732 without damaging hinge material 722 disposed therein, or fusing the cut or slit disposed in each subassembly. Once subassemblies 730, 732 are laminated together, individual transaction cards may be cut or punched out in step 764.

Figure 35:
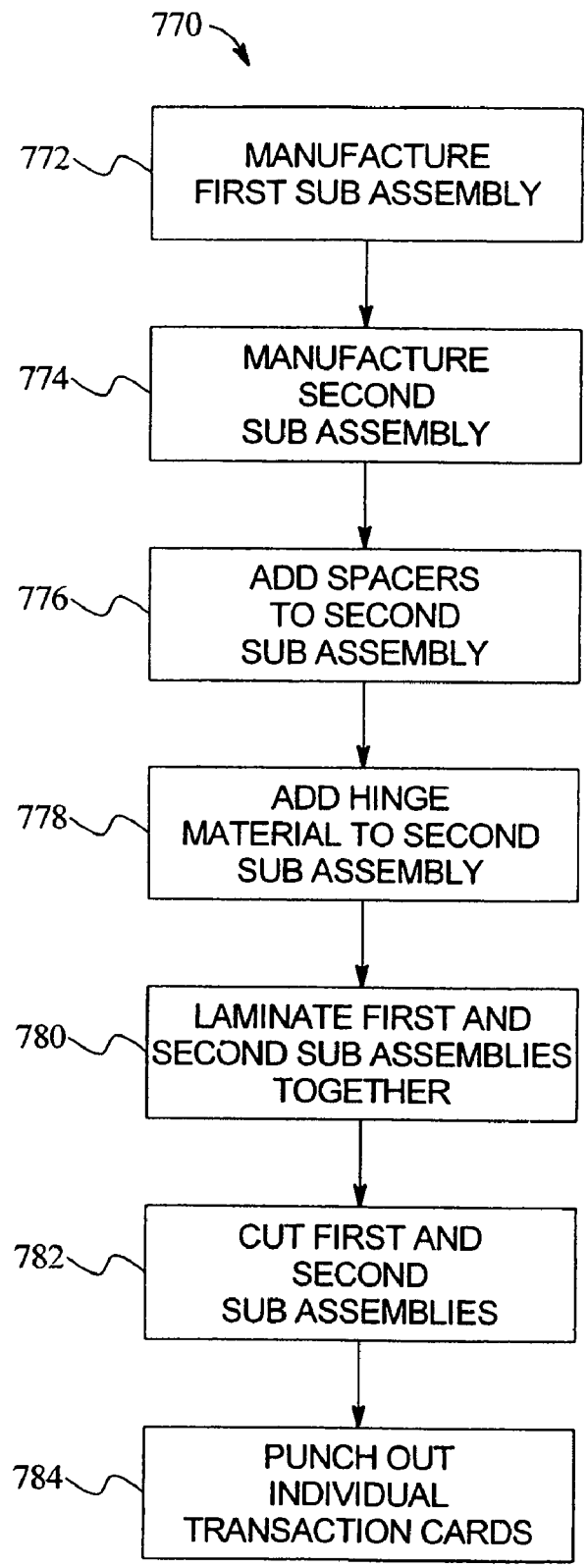
FIG. 35 illustrates a flow chart showing an example of a method of making the foldable transaction card in a still further embodiment of the present invention.

FIG. 35 illustrates a method of making foldable transaction cards described herein in a flowchart 770. In a first step 772, first subassembly 730 may be manufactured by laminating adhesive layer 714, graphic layer 712 and top layer 710 together in a first sheet. In a second step 774, second subassembly 732 may be manufactured by laminating second adhesive layer 724, second graphic layer 726 and bottom layer 728 together in a second sheet. In step 776, first spacer 718 and second spacer 720 may be added to second subassembly 732. First spacer 718 and second spacer 720 may be tacked or otherwise adhered to second subassembly 732 so as to be unmovable until the subassemblies are laminated together. Hinge material 722 may then be added in step 778 between first spacer 718 and second spacer 720.

In step 780, first subassembly 730 and second subassembly 732 may be laminated together with heat and pressure to fuse first subassembly 730 to second subassembly 732 without damaging hinge material 722 disposed therein. In step 782, a cutter may slit first and second subassemblies 730, 732 to form fold line 702, without cutting or slitting the hinge material disposed between first subassembly 730 and second subassembly 732. Once subassemblies 730, 732 are laminated together, individual transaction cards may be punched out, cut or otherwise removed in step 784.

After the cards are punched out in steps 764 and 784, described above with reference to FIGS. 32, 33, the individual transaction cards may be personalized by adding account information, personal information, and other like information to the transaction card by embossing the transaction or via any other method apparent to one having ordinary skill in the art.

The present invention has been described above with reference to exemplary embodiments. However, those skilled in the art having read this disclosure will recognize that changes and modifications may be made to the exemplary embodiments without departing from the scope of the present invention.

We claim:

1. A method of making a transaction card comprising:
   laminating a first layer comprising an upper surface and a lower surface to an internal hinge layer comprising a first surface and a second surface such that a first portion of said first surface of said internal hinge layer is in direct contact with said lower surface of said first layer;
   laminating a second layer comprising an upper surface and a lower surface to said internal hinge layer such that a first portion of said second surface of said internal hinge layer is in direct contact with said upper surface of said second layer; and
   creating a folding locus on a third portion of said internal hinge layer that is not in direct contact with said first layer and said second layer, said folding locus permitting folding of said transaction card at said folding locus, wherein said internal hinge layer comprises at least one of an elastomeric material or a thermoplastic polymeric material.

2. The method of claim 1, further comprising removing said first layer and said second layer along a fold line.

3. The method of claim 1, further comprising creating a gap in said first layer along a fold line; and creating a gap in said second layer along said fold line.

4. The method of claim 1, wherein said step of laminating said first layer to said internal hinge layer is performed such that at least a portion of said first surface of said internal hinge layer is coextensive with said lower surface of said first layer.

5. The method of claim 1, wherein said step of laminating said second layer to said internal hinge layer is performed such that at least a portion of said second surface of said internal hinge layer is coextensive with said upper surface of said second layer.

6. The method of claim 1, wherein said first layer comprises a graphic layer.

7. The method of claim 1, wherein said lower surface of said first layer comprises an adhesive layer.

8. The method of claim 1, wherein said second layer comprises a graphic layer.

9. The method of claim 1, wherein said upper surface of said second layer comprises an adhesive layer.

10. The method of claim 1, wherein said step of laminating said first layer to said internal hinge layer comprises said internal hinge layer providing tension when said transaction card is in an unfolded state such that said transaction card is substantially planar in said unfolded state.

11. The method of claim 1, further comprising disposing said transaction card in a carrier.

12. The method of claim 1, further comprising disposing said transaction card in a carrier such that said transaction card is foldable outside said carrier.

13. The method of claim 1, wherein said transaction card facilitates a purchase transaction at a point of sale.

14. The method of claim 1, wherein said internal hinge layer comprises an elastomeric material.

15. The method of claim 1, wherein said internal hinge layer comprises a thermoplastic polymeric material.

16. The method of claim 1, wherein said step of laminating said first layer to said internal hinge layer comprises said transaction card having a tendency to return to an unfolded state when said transaction card is in a folded state.

* * * * *